(12) United States Patent
Tarutani

(10) Patent No.: US 10,041,191 B1
(45) Date of Patent: Aug. 7, 2018

(54) POLYETHYLENE POWDER, AND MOLDED ARTICLE AND FIBER THEREOF

(71) Applicant: Asahi Kasei Kabushiki Kaisha, Tokyo (JP)

(72) Inventor: Atsuyoshi Tarutani, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/591,541

(22) Filed: May 10, 2017

(51) Int. Cl.
*B32B 5/16* (2006.01)
*C08F 110/02* (2006.01)
*D01F 6/04* (2006.01)
*B29B 9/00* (2006.01)

(52) U.S. Cl.
CPC .............. *D01F 6/04* (2013.01); *B29B 9/00* (2013.01); *C08F 110/02* (2013.01)

(58) Field of Classification Search
CPC .. C08F 10/00; Y20S 526/905; Y20S 526/909; B29B 9/00
USPC .................................... 526/159, 909; 428/402
See application file for complete search history.

(56) References Cited

U.S. PATENT DOCUMENTS

| | | | | |
|---|---|---|---|---|
| 3,090,778 A | * | 5/1963 | Ehrlich | B29B 9/00 526/348.7 |
| 3,372,154 A | * | 3/1968 | Turner | C08F 10/00 526/352.2 |
| 3,984,387 A | * | 10/1976 | Liu | C08F 10/00 526/153 |
| 4,760,120 A | * | 7/1988 | Sano | C08F 10/02 428/402 |
| 2011/0207907 A1 | | 8/2011 | Simmelink | |
| 2013/0046040 A1 | * | 2/2013 | Srinivasan | B01D 39/1661 521/143 |

FOREIGN PATENT DOCUMENTS

| | | |
|---|---|---|
| JP | 2004-124277 A | 4/2004 |
| JP | 3666635 B2 | 6/2005 |
| JP | 2007-297763 A | 11/2007 |
| JP | 2011-241485 A | 12/2011 |
| JP | 5327488 B2 | 10/2013 |

* cited by examiner

*Primary Examiner* — Hoa (Holly) Le
(74) *Attorney, Agent, or Firm* — Morgan, Lewis & Bockius LLP

(57) ABSTRACT

A polyethylene powder, wherein the specific surface area as determined by the BET method is 0.20 m²/g or larger and 0.80 m²/g or smaller, the pore volume as determined by mercury penetration method is 0.95 mL/g or smaller, the full width at half maximum of a melting endothermic peak in differential scanning calorimetry is 6.00° C. or smaller, the viscosity-average molecular weight is 100000 or higher and 10000000 or lower, and the average particle size is 100 μm or larger and 300 μm or smaller.

8 Claims, 1 Drawing Sheet

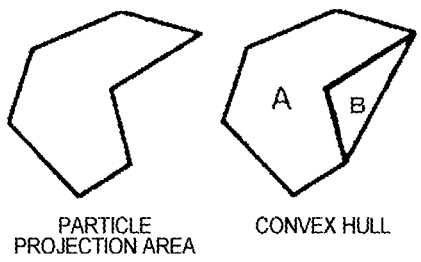

POLYETHYLENE POWDER, AND MOLDED ARTICLE AND FIBER THEREOF

BACKGROUND OF THE INVENTION

Field of the Invention

The present invention relates to a polyethylene powder, and a molded article and fiber thereof.

Description of the Related Art

Polyethylene powders are used as a starting material for various products such as films, sheets, microporous membranes, fibers, foams, and pipes. In particular, high-molecular-weight polyethylene powders are suitably used as a starting material for microporous membranes for separators for secondary batteries typified by lead-acid batteries and lithium ion batteries, and a starting material for high-strength fibers. The reason why high-molecular-weight polyethylene powders are used for such applications is, for example, that they are excellent in stretchability, and has high tensile strength and high chemical stability.

High-molecular-weight polyethylene powders generally have high viscosity, and this high viscosity complicates processing of a high-molecular-weight polyethylene powder through injection molding or the like. For this reason, it is common that a high-molecular-weight polyethylene powder is dissolved in a solvent and then molded. In the case of processing into a fiber, for example, an ultra-high-molecular-weight polyethylene is dissolved in a solvent to prepare a dilute solution, and the solution is spun and stretched. Thereby, a high-strength fiber having high elastic modulus and tensile strength, and being highly oriented can be obtained.

Regarding high-molecular-weight polyethylenes, techniques to reduce defects to be generated in molding and homogenize the structure are disclosed. For example, Japanese Patent No. 5327488 discloses that optimization of the reducing rate for a solvent in desolventization in spinning process can reduce defects in the crystal structure of polyethylene. Japanese Patent Laid-Open No. 2007-297763 discloses that addition of a poor solvent as a solvent prevents the polyethylene molecular chain from spreading to reduce tangling of the molecular chain, which causes defects, and thus prevents formation of a heterogeneous structure. Further, Japanese Patent No. 3666635 discloses that homogenization of the evaporation rate of a solvent in discharging a polyethylene solution from a nozzle in combination with homogeneous cooling of a gel discharged from a spinneret to reduce the crystal size provides a molded article having a homogeneous crystal structure.

Furthermore, Japanese Patent Publication No. 7-29372 discloses use of a paraffin wax in place of a liquid solvent allows homogeneous dissolution of polyethylene. Japanese Patent Laid-Open No. 2011-241485 discloses that a dialkyl ketone is used as an additive to inhibit generation of a gelled substance with high viscosity due to heterogeneous dissolution. Although these Patent Literatures 1 to 5 refer to the properties of a polyethylene solution, they do not refer to improvement of the properties of a polyethylene powder as a starting material.

In recent years, high-strength fibers formed from ultra-high-molecular-weight polyethylene are increasingly required to have higher performance. Japanese Patent Laid-Open No. 2004-124277 discloses a technique in which carbon nanotubes are mixed in ultra-high-molecular-weight polyethylene and the resultant is sufficiently stretched to homogeneously disperse the carbon nanotubes oriented in the fiber axis direction. In addition, the literature discloses that such an ultra-high-molecular-weight polyethylene fiber with oriented carbon nanotubes is a fiber where poor thermal resistance, which is an inevitable feature of polyethylene, is overcome, in particular, elastic thermal resistance is improved in the fiber axis direction and thus mechanical characteristics are less degradable. Although the literature describes various conditions in relation to dispersion of carbon nanotubes, such as the characteristics of carbon nanotubes, a solvent for mixing, pre-dispersion of components before kneading, and extrusion equipment to apply high sheer, the interfiber dispersion of carbon nanotubes is not evaluated at all, and the degree of homogeneous dispersion is unclear. In addition, the literature does not refer to improvement of the dispersibility of a filler inclusion due to the feature of a polyethylene powder as starting material.

When polyethylene derived from a conventional polyethylene powder is molded into a fiber at a higher draw ratio for improvement of the tensile strength, however, a higher load is applied to the fiber, and disadvantageously, the fiber breaks (thread breakage). If an undissolved polyethylene powder remains as a particle in a step of dissolving polyethylene in a solvent, on the other hand, thread breakage in spinning after molding and partial lowering of the tensile strength of the fiber may be disadvantageously caused. In addition, when polyethylene is kneaded with a filler such as a carbon nanotube for providing the polyethylene with higher performance to prepare a nanocomposite, the filler is unevenly dispersed, and the functional expression of the ultra-high-molecular-weight polyethylene composite is disadvantageously inhibited. Accordingly, it is important for improvement of the tensile strength and elastic modulus to obtain a molded article with fewer defects through homogeneously dissolving polyethylene in a step of dissolving polyethylene in a solvent.

In view of this, an object of the present invention is to provide a polyethylene powder capable of quickly dissolving in a solvent with less generation of undissolved matter, and capable of improving filler dispersibility in a stretched product or fiber obtained with a filler.

SUMMARY OF THE INVENTION

The present inventors diligently studied to solve the above problems inherent in conventional arts, and found that a polyethylene powder having a specific surface area, pore volume, full width at half maximum of a melting endothermic peak, viscosity-average molecular weight, and average particle size each in a particular range is capable of quickly dissolving in a solvent with less generation of undissolved matter, and capable of improving filler dispersibility in a mixture when being mixed with a filler, and thus reached the present invention.

Specifically, the present invention is as follows.

[1]

A polyethylene powder, wherein the specific surface area as determined by the BET method is 0.20 $m^2/g$ or larger and 0.80 $m^2/g$ or smaller, the pore volume as determined by mercury penetration method is 0.95 mL/g or smaller, the full width at half maximum of a melting endothermic peak in differential scanning calorimetry is 6.00° C. or smaller, the viscosity-average molecular weight is 100000 or higher and 10000000 or lower, and the average particle size is 100 μm or larger and 300 μm or smaller.

[2]

The polyethylene powder according to [1], wherein the viscosity-average molecular weight is 1000000 or higher and 9500000 or lower.

[3]

The polyethylene powder according to [1] or [2], wherein the ratio of the number of particles having an aspect ratio of 0.66 or larger and 0.84 or smaller to the total number of particles is 50% or higher.

[4]

The polyethylene powder according to any of [1] to [3], wherein the ratio of the number of particles having a degree of unevenness, as defined in the following formula (1), of 0.95 or higher to the total number of particles is 25% or higher:

$$UD=A/(A+B) \quad (1)$$

wherein UD denotes degree of unevenness; A denotes the projected area of a particle of interest; and (A+B) denotes the projected area enclosed in an envelope connecting vertexes of the particle of interest.

[5]

The polyethylene powder according any of [1] to [4], wherein the angle of repose is 34° or larger and 45° or smaller.

[6]

The polyethylene powder according to any of [1] to [5], wherein the polyethylene powder is used for a fiber.

[7]

A fiber produced by using the polyethylene powder according to [6].

[8]

A molded article obtained through molding of the polyethylene powder according to any of [1] to [5].

Advantageous Effects of the Invention

The polyethylene powder according to the present invention has quick solubility in a solvent with less generation of undissolved matter. In addition, the polyethylene powder according to the present invention provides a molded article or fiber excellent in filler dispersibility when being mixing with a filler.

BRIEF DESCRIPTION OF THE DRAWING

FIG. 1 is a schematic diagram for describing a method for determining degree of unevenness in embodiments of the present invention.

DETAILED DESCRIPTION OF THE PREFERRED EMBODIMENTS

Embodiments of the present invention (hereinafter, referred to as "the present embodiments") will be described in detail below. The present embodiments below are examples for describing the present invention, and are not intended to limit the present invention to the contents below. The present invention may be implemented with an appropriate modification without departing from the gist.

[Polyethylene Powder]

In the polyethylene powder according to the present embodiments (hereinafter, also referred to as "powder" or "particle", simply), the specific surface area as determined by the BET method is 0.20 m²/g or larger and 0.80 m²/g or smaller, the pore volume as determined by mercury penetration method is 0.95 mL/g or smaller, the full width at half maximum of a melting endothermic peak in differential scanning calorimetry is 6.00° C. or smaller, the viscosity-average molecular weight is 100000 or higher and 10000000 or lower, and the average particle size is 100 μm or larger and 300 μm or smaller. The polyethylene powder is not limited, and examples thereof include ethylene homopolymers and copolymers of ethylene and an additional comonomer.

The ethylene homopolymer refers to a polymer with 99.5 mol % or more of the repeating units consisting of ethylene. In the case that the polyethylene powder is ethylene homopolymer, polyethylene powder can be stretched into a highly oriented state, and thus a fiber excellent in tensile strength can be provided. In the case that the polyethylene powder is a copolymer with an additional comonomer, side reaction during polymerization is inhibited and the polymerization rate is enhanced, and thus a fiber with improved creep properties can be provided.

Examples of the additional comonomer include, but not limited thereto, α-olefins and vinyl compounds. The α-olefin is not limited, and examples thereof include α-olefins having 3 to 20 carbon atoms, more specifically, propylene, 1-butene, 4-methyl-1-pentene, 1-hexene, 1-octene, 1-nonene, 1-decene, 1-undecene, 1-dodecene, 1-tridecene, and 1-tetradecene. Among them, propylene and 1-butene are preferred from the viewpoint of the thermal resistance and strength of a molded article typified by membranes and fibers. One comonomer may be used singly, or two or more thereof may be used in combination.

The mole ratio of ethylene in the copolymer is preferably 50% or more and less than 99.5%, more preferably 80% or more and less than 99.2%, and even more preferably 90% or more and less than 99%, from the viewpoint of the tensile strength of a fiber. In the case that the polyethylene powder is a copolymer, the quantity of the additional comonomer in the copolymer can be measured, for example, through NMR.

The polyethylene powder according to the present embodiments may contain an additive such as a neutralizer, an antioxidant, and a light stabilizer.

A neutralizer functions, for example, as a scavenger for chlorine or the like contained in the polyethylene powder, or as a molding aid. Examples of such neutralizers include, but not limited to, stearates of an alkali earth metal such as calcium, magnesium, and barium. The content of the neutralizer is not limited. However, the content of the neutralizer is preferably 5000 ppm by mass or less, more preferably 4000 ppm by mass or less, and even more preferably 3000 ppm by mass or less. In the case of a polyethylene powder obtained through a slurry polymerization method with a metallocene catalyst, halogen components can be removed from the catalyst constituent without use of the neutralizer.

Examples of antioxidants include, but not limited to, phenolic compounds such as dibutylhydroxytoluene, pentaerythrityl-tetrakis[3-(3,5-di-t-butyl-4-hydroxyphenyl)propionate] and octadecyl-3-(3,5-di-t-butyl-4-hydroxyphenyl)propionate. The content of the antioxidant is not limited. However, the content of the antioxidant is preferably 5000 ppm by mass or less, more preferably 4000 ppm by mass or less, and even more preferably 3000 ppm by mass or less.

Examples of light stabilizers include, but not limited to, benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine compounds such as bis(2,2,6,6-tetramethyl-4-piperidine) sebacate and poly[{6-(1,1,3,3-tetramethylbutyl)amino-1,3, 5-triazin-2,4-diyl}{(2,2,6,6-tetramethyl-4-piperidyl)imino}hexamethylene{(2,2,6,6-tetramethyl-4-piperidyl)imino}]. The content of the light stabilizer is not limited. However, the content of the light stabilizer is preferably 5000 ppm by mass or less, more preferably 4000 ppm by mass or less, and even more preferably 3000 ppm by mass or less.

To determine the content of the additive in the polyethylene powder, for example, extraction is performed by using Soxhlet extraction with tetrahydrofuran (THF) for 6 hours, and the extracted solution is subjected to separation and quantification by using liquid chromatography.

[Specific Surface Area]

The specific surface area of the polyethylene powder as determined by the BET method is 0.20 $m^2/g$ or larger and 0.80 $m^2/g$ or smaller, preferably 0.25 $m^2/g$ or larger and 0.60 $m^2/g$ or smaller, and more preferably 0.30 $m^2/g$ or larger and 0.40 $m^2/g$ or smaller. The specific surface area of the polyethylene powder according to the present embodiments is a specific surface area determined in accordance with the BET method (specific surface area method), and can be determined in accordance with a method described later in Examples.

The configuration in which the specific surface area is 0.20 $m^2/g$ or larger and 0.80 $m^2/g$ or smaller allows dissolution in the inside of the powder to proceed in parallel with dissolution on the surface of the powder. Thereby, generation of undissolved matter due to heterogeneous dissolution can be prevented.

The specific surface area relates to the surface structure and internal structure of the polyethylene powder. In a polyethylene powder having a specific surface area of 0.20 $m^2/g$ or larger, the smoothness of the surface is small, and many pores penetrate from the surface into the inside and many voids isolated from the outside are present in the inside. In dissolving such a polyethylene powder in a solvent, the polyethylene powder contacts with a solvent in a large area. Accordingly, the polyethylene powder requires a shorter period to dissolve into a homogeneous solution because of its lower solubility, and thus provides better production efficiency.

Further, by virtue of the configuration in which the specific surface area is 0.80 $m^2/g$ or smaller, the number of voids present in the inside in isolation from the outside is not larger than the number of pores penetrating from the surface into the inside, and thus a solvent can easily permeate the inside of the polyethylene powder. In addition, the solubility is not lowered because interruption of thermal conduction by the voids present in the inside is inhibited. As a result, generation of a particle in which a part in the vicinity of the surface is dissolved and swelled and the inside is undissolved is prevented. Consequently, a huge agglomerate is less likely to be formed through fusion of particles at the outer surfaces, and formation of defects due to generation of poorly soluble undissolved matter is prevented.

Examples of methods for controlling the specific surface area within the above range include control of synthesis conditions for a catalyst to be used in polymerization into polyethylene, and control of a post-treatment method for a polyethylene slurry after polymerization. To achieve a specific surface area of 0.20 $m^2/g$ or larger, for example, the drying temperature is suitably set to 150° C. or lower in post-treatment of a polyethylene slurry after polymerization. To achieve a specific surface area of 0.80 $m^2/g$ or smaller, for example, preparation is performed suitably under synthesis conditions for a catalyst such that a solid catalyst with homogeneously disposed catalytic active sites is provided, and in addition the drying temperature is suitably set to 60° C. or higher in post-treatment of a polyethylene slurry after polymerization.

Examples of synthesis conditions for a catalyst include the concentrations of starting materials of a catalyst in catalyst synthesis, the feeding rate of the starting materials, and the stirring speed in synthesis. To synthesize a solid catalyst with homogeneously dispersed catalytic active sites, specifically, the concentrations of starting materials of a catalyst are diluted, the feeding late of the starting materials of a catalyst is set low, and the stirring speed in synthesis is set high.

The degree of growth of a polymer chain with a solid catalyst depends on the distribution of catalytic active sites on the surface of the solid catalyst. A solid catalyst synthesized with delayed addition of starting materials at low concentrations has sufficiently dispersed catalytic active sites on the surface, and the catalytic active sites tend to be homogeneously present without agglomerating. On the surface of such a solid catalyst, polymer chains homogeneously grow. As a result, unevenness is less likely to be generated on the surface of a resulting powder. Use of a solid catalyst with homogeneously disposed catalytic active sites can provide a polyethylene powder with a proper specific surface area.

The catalyst to be used is not limited, and common Ziegler-Natta catalysts and metallocene catalysts are applicable. However, it is preferred to use a particular catalyst described later.

To control a post-treatment method for a polyethylene slurry after polymerization, the drying temperature is changed. At higher drying temperature, the surface of a polyethylene powder tends to fuse in drying to fill the pores present in the surface or smooth the unevenness. Thus, the surface area can be reduced.

[Pore Volume]

In the polyethylene powder according to the present embodiments, the pore volume as determined by mercury penetration method is 0.95 mL/g or smaller, preferably 0.90 mL/g or smaller, and more preferably 0.85 mL/g or smaller. The pore volume of the polyethylene powder according to the present embodiments is a pore volume as determined by mercury penetration method, and can be determined in accordance with a method described later in Examples.

The configuration in which the pore volume is 0.95 mL/g or smaller provides the polyethylene powder with improved solubility. The pore volume relates to the internal structure and state of agglomeration of the polyethylene powder. Specifically, the pore volume reflects the volume of pores penetrating from the surface into the inside, and in the case that particles of the polyethylene powder are agglomerating, the pore volume reflects the volume of spaces present in the agglomerate. By virtue of the configuration in which the pore volume is 0.95 mL/g or smaller, the number of pores communicating from the surface is not too large, and a sufficient quantity of a solvent can reach the inside of a particle in dissolution, and thus formation of a particle including a gas in the inside is prevented. Accordingly, the solubility of the polyethylene powder improves.

Examples of methods for controlling the pore volume within the above range include control of synthesis conditions for a catalyst to be used in polymerization into polyethylene, and control of polymerization conditions for polyethylene. To achieve a pore volume of 0.95 mL/g or smaller, for example, the polymerization pressure among polymerization conditions for polyethylene is suitably set to 0.1 MPa or higher, or the content of a solvent before drying a polymer is suitably set to 60% by mass or less, or the positions for feeding a catalyst and ethylene to a polymerization apparatus are suitably separated by a predetermined distance or a larger distance so as to allow the catalyst and ethylene to contact with each other to polymerize after they are sufficiently diffused in the polymerization apparatus.

Examples of synthesis conditions for a catalyst include the concentrations of starting materials of a catalyst in catalyst synthesis reaction and the feeding rate of the starting materials. Specifically, the concentrations of starting materials of a catalyst are diluted and the feeding late of the starting materials of a catalyst is set low to prevent the agglomeration of catalytic active sites in a solid catalyst. In the case without the agglomeration of catalytic active sites, each of polymers growing from catalytic active sites homogeneously present does not reach a size such that the polymer comes into contact with a polymer growing from another distant catalytic active site. For this reason, the inner void space cannot increase before growing polymers come into contact with each other, and as a result the pore volume does not increase.

The catalyst to be used is not limited, and common Ziegler-Natta catalysts and metallocene catalysts are applicable. However, it is preferred to use a particular catalyst described later.

Examples of conditions for polymerization of ethylene include low polymerization temperature, positioning the outlet of a catalyst-introducing line and the outlet of an ethylene-introducing line apart by as large a distance as possible, and low concentration of a catalyst slurry. Such conditions prevent the volume expansion of the polyethylene powder due to rapid polymerization, and thus can provide a polyethylene powder having a dense structure with fewer pores.

[Full Width at Half Maximum of Melting Endothermic Peak]

In the polyethylene powder according to the present embodiments, the full width at half maximum of a melting endothermic peak in differential scanning calorimetry is 6.00° C. or smaller, preferably 5.50° C. or smaller, and more preferably 5.25° C. or smaller. The full width at half maximum of a melting endothermic peak of the polyethylene powder according to the present embodiments is a full width at half maximum of a melting endothermic peak determined by using differential scanning calorimetry, and can be determined in accordance with a method described later in Examples.

The configuration in which the full width at half maximum of a melting endothermic peak is 6.00° C. or smaller provides the polyethylene powder with improved solubility. This is presumably because the melting transition of a polymer rapidly occurs and as a result dissolution of the polyethylene powder in a solvent completes in a short period. In addition, the configuration in which the full width at half maximum of a melting endothermic peak is 6.00° C. or smaller prevents a polymer from undergoing uneven melting transition. By virtue of this, the coexistence of a quickly-soluble portion and a poorly-soluble portion is avoided and the polyethylene powder homogeneously dissolves through precisely controlling dissolution conditions at constant, and thus satisfactory production stability is provided. In addition, the filler dispersibility in a nanocomposite improves. This is presumably because, in dissolving polyethylene, homogeneous dissolution can be achieved in a short period as described above, and by virtue of this, the dispersibility of the filler component in kneading also becomes better; also in gelling (solidification) through cooling during molding process for a dissolved nanocomposite, the transition of polyethylene tends to occur rapidly with little temporal difference from the occurrence of the solidification, i.e., the crystallization of polyethylene, and thus the positional change of the homogeneously dispersed filler can be prevented. Also in the case of polyethylene homogeneously swelled with and dissolved in a solution, a certain structural memory effect derived from the starting materials presumably exists, although it is not clear. The heat of fusion of high-molecular-weight polyethylene depends on the lamellar thickness of the crystal. Specifically, a small full width at half maximum of a melting endothermic peak is considered to be correlated to a homogeneous crystal structure of polyethylene.

Examples of methods for controlling the full width at half maximum of a melting endothermic peak to 6.00° C. or smaller include a method of positioning the outlet of a catalyst-introducing line and the outlet of an ethylene monomer-introducing line apart by as large a distance as possible in a reactor in polymerization of ethylene, and further include a method of equalizing the temperature between components to be introduced and the inside of a reactor to reduce temperature unevenness in the reactor until the components just after being introduced diffuse throughout the inside of the reactor. These methods prevent rapid polymerization into polyethylene to a maximum extent and keep the growth rate of the molecular chain constant, and thus can homogenize the crystal structure of the polyethylene powder. Another example is a method of reducing the quantity of a solvent remaining in the inside of a polymer after polymerization of ethylene. The change of the crystal structure such as the crystallization of an amorphous portion can be prevented through promotion of the diffusion of the molecular chain or lowering of the content of a solvent in the inside of the polymer. Still another example is a method of reducing temperature difference during processes from polymerization to drying for the polyethylene powder. In particular, a drying temperature being kept low prevents the structural change such as the melting of the crystal of the polyethylene powder and increase of the lamellar thickness due to recrystallization, and thus the crystal structure can be kept homogeneous.

[Viscosity-Average Molecular Weight (Mv)]

In the polyethylene powder according to the present embodiments, the viscosity-average molecular weight (Mv) is 100000 or higher and 10000000 or lower, preferably 1000000 or higher and 9500000 or lower, more preferably 1000000 or higher and 9000000 or lower, and even more preferably 3000000 or higher and 8000000 or lower. The viscosity-average molecular weight (Mv) in the present embodiments can be measured in accordance with a method described later in Examples.

The configuration in which the viscosity-average molecular weight (Mv) is 100000 or higher provides a molded article excellent in mechanical strength such as tensile strength.

The configuration in which the viscosity-average molecular weight (Mv) is 10000000 or lower provides the polyethylene powder with improved solubility, and allows formation of a homogeneous solution with little undissolved matter in a short period. Thereby, improved production stability and mechanical strength is provided to a fiber. In addition, improved stretchability is provided.

Examples of methods for controlling the viscosity-average molecular weight (Mv) within the above range include changing the temperature in polymerization of ethylene. The molecular weight tends to become lower as the polymerization temperature becomes higher, and the molecular weight tends to become higher as the polymerization temperature becomes lower. Another method for achieving a viscosity-average molecular weight (Mv) of 10000000 or lower is, for example, addition of a chain transfer agent such as hydrogen in polymerization of ethylene. If a chain transfer agent is added, resulting polyethylene is likely to have a lower molecular weight even at the same polymerization temperature. It is preferred to control the viscosity-average molecular weight (Mv) of polyethylene through combination of both of the above methods.

[Average Particle Size]

In the polyethylene powder according to the present embodiments, the average particle size is preferably 100 μm or larger and 300 μm or smaller, more preferably 120 μm or larger and 280 μm or smaller, and even more preferably 150 μm or larger and 250 μm or smaller. The average particle size according to the present embodiments can be measured in accordance with a method described later in Examples.

The configuration in which the average particle size is 100 μm or larger provides the polyethylene powder with sufficiently high bulk density and flowability, and thus can provide better handleability, for example, in charging the polyethylene powder into a hopper or the like and weighing the polyethylene powder from a hopper.

The configuration in which the average particle size is 300 μm or smaller provides the polyethylene powder with improved solubility.

In the present embodiments, the average particle size can be controlled, for example, via the particle size of a catalyst to be used, and a polyethylene powder with a larger average particle size is likely to be obtained as the particle size of a catalyst is larger, and a polyethylene powder with a smaller average particle size is likely to be obtained as the particle size of a catalyst is smaller. In addition, the average particle size can be controlled via the activity of a catalyst and polymerization conditions for polyethylene. To achieve an average particle size of 300 μm or smaller, more specifically, the polymerization pressure, among polymerization conditions for polyethylene, is suitably set to 0.1 MPa or higher, or the content of a solvent before drying the polymer is suitably set to 60% by mass or less.

[Aspect Ratio]

In the polyethylene powder according to the present embodiments, the ratio of the number of particles having an aspect ratio of 0.66 or larger and 0.84 or smaller (hereinafter, also referred to as "particular particle X") to the total number of particles is preferably 50% or higher, more preferably 55% or higher, and even more preferably 60% or higher. The aspect ratio in the present embodiments can be measured in accordance with a method described later in Examples. Then, the ratio of the number of the particular particles X can be determined at the same time.

The particular particles X poorly agglomerate, and are less likely to become undissolved matter. Particles with an aspect ratio of 0.66 or larger, in other words, with a form not excessively flat, are prevented from contacting with each other at the surface, and thus less likely to fuse with each other. Particles with an aspect ratio of 0.84 or smaller, in other words, with a form not excessively close-to-spherical, are prevented from forming the closest packing, and thus are less likely to fuse with each other.

Examples of methods for controlling the ratio of the number of the particular particles X within the above range include controlling synthesis conditions for a catalyst, in particular, controlling synthesis conditions during solid precipitation reaction in synthesis of a catalyst. In solid precipitation reaction, the shape of a carrier can be controlled to be flat through increase of the stirring speed.

[Degree of Unevenness]

In the polyethylene powder according to the present embodiments, the ratio of the number of particles having a degree of unevenness of 0.95 or higher (hereinafter, also referred to as "particular particle Y") to the total number of particles is preferably 25% or higher, and more preferably 30% or higher. The degree of unevenness in the present embodiments is a value defined in a formula (1) below, and can be measured in accordance with a method described later in Examples. Then, the content of the particular particle Y can be determined at the same time.

$$UD=A/(A+B) \qquad (1)$$

In the formula (1), UD denotes degree of unevenness; A denotes the projected area of a particle of interest; and (A+B) denotes the projected area enclosed in an envelope connecting vertexes of a particle of interest.

The degree of unevenness is 0.00 or higher and 1.00 or lower. As the degree of unevenness is closer to 1.00, the particle has a smoother surface with less unevenness. FIG. 1 is a schematic diagram for describing a method for determining the degree of unevenness in the present embodiments. For example, the projected area (A) of a particle of interest can be determined from "PARTICLE PROJECTION AREA" as the left figure in FIG. 1. Subsequently, the projected area (A+B) enclosed in an envelope connecting vertexes of the PARTICLE PROJECTION AREA is determined as an area including the part A and part B of "CONVEX HULL" as the right figure in FIG. 1.

The configuration in which the ratio of the number of the particular particles Y is 25% or higher provides the polyethylene powder with sufficiently high flowability, and thus can provide better handleability, for example, in charging the polyethylene powder into a hopper or the like and weighing the polyethylene powder from a hopper.

Examples of methods for controlling the ratio of the number of the particular particles Y in the above range include reducing the heat generation derived from rapid polymerization reaction caused in production of the polyethylene powder. Specific examples of methods for reducing the heat generation include polymerizing through continuous polymerization, in which ethylene gas, a solvent, a catalyst, and so on are continuously fed into the polymerization system and they are continuously discharged together with an ethylene polymer formed. In addition, positioning the outlet of a catalyst-introducing line and the outlet of an ethylene monomer-introducing line apart by as large a distance as possible, lowering the concentration of a catalyst feed, and providing a gas phase section of a reactor with an ethylene monomer inlet are each an effective method. These methods can prevent rapid polymerization reaction to prevent formation of a deformed polyethylene powder and formation of an agglomerate of a polyethylene powder. Another example is a method of intentionally allowing the polyethylene powder during process to undergo interparticle collision. For example, the powder is allowed to undergo interparticle collision for promoting abrasion of the powder through extending the retention time during drying process, and thus the unevenness can be reduced.

[Angle of Repose]

In the polyethylene powder according to the present embodiments, the angle of repose is preferably 34° or larger and 45° or smaller, and more preferably 38° or larger and 43° or smaller. The angle of repose in the present embodiments can be measured in accordance with a method described later in Examples.

The polyethylene powder according to the present embodiments has a large angle of repose, which suggests that, when the particles come into contact with each other, the particles are easily interlocked. An angle of repose of 34° or larger is preferred because elimination/release of a solvent and moisture from the polymer is promoted during drying. This allows a shorter drying time than the case of conventional polyethylene, or enables easy drying through removal of a solvent and moisture in low-temperature drying. Presumably, the permeation of a solvent into the inside, which is the reverse of release of a solvent from the inside, is also promoted, which affects improvement of the solubility of the powder.

The configuration in which the angle of repose of the polyethylene powder is 45° or smaller can prevent deterioration of the flowability such as generation of a bridge of the powder at a hopper or the like due to large interparticle friction.

Examples of methods for controlling the angle of repose within the above range include adjustment of synthesis conditions for a catalyst, for example, adjustment of the concentrations of starting materials of a catalyst and the feeding rate of the starting materials in catalyst synthesis reaction. Specifically, the concentrations of starting materials of a catalyst are diluted and the feeding late of the starting materials of a catalyst is set low to prevent the agglomeration of catalytic active sites in a solid catalyst. In the case without the agglomeration of catalytic active sites, each of catalyst particle-linked polymers equally spaced on a carrier grows equally into a fine particle polymer, and as a result the outermost surface is composed of a collection of circular arcs of particles each derived from a single molecular catalytic active site. Thus, the surface area of the outermost surface is larger, and the angle of repose of the particle of the polyethylene powder is also larger.

[Method for Producing Polyethylene Powder]

The method for producing the polyethylene powder according to the present embodiments is not limited, and the polyethylene powder according to the present embodiments can be produced with a common Ziegler-Natta catalyst. It is preferred to use a particular Ziegler-Natta catalyst described in the following.

The particular Ziegler-Natta catalyst is a catalyst for polymerization of olefin, the catalyst consisting of a solid catalyst component [A] and an organometal compound component [B]. The solid catalyst component [A] is produced, for example, through reacting an organomagnesium compound (A-1) which is soluble in inert hydrocarbon solvents and represented by the following formula (2) (hereinafter, also referred to as "(A-1)", simply) and a titanium compound (A-2) represented by the following formula (3) (hereinafter, also referred to as "(A-2)", simply):

$$(M^1)_\alpha(Mg)_\beta(R^2)_a(R^3)_b Y^1{}_c \qquad (2)$$

in the formula (2), $M^1$ denotes a metal atom belonging to the group 12, the group 13, or the group 14 in the periodic table; $R^2$ and $R^3$ each independently denote a hydrocarbon group having 2 or more and 20 or less carbon atoms; $Y^1$ denotes an alkoxy group, a siloxy group, an allyloxy group, an amino group, an amide group, $-N=CR^4R^5$, $-SR^6$, or a β-keto acid residue, wherein $R^4$, $R^5$, and $R^6$ each independently denote a hydrocarbon group having 1 or more and 20 or less carbon atoms, and in the case that c is 2, a plurality of $Y^1$ may be different from each other; α, β, a, b, and c are each a real number and they satisfy $0 \leq \alpha$, $0 < \beta$, $0 \leq a$, $0 \leq b$, $0 \leq c$, $0 < a+b$, $0 \leq b/(\alpha+\beta) \leq 2$, and $n\alpha+2\beta=a+b+c$, wherein n denotes the valence of $M^1$; and in the case that a plurality of $M^1$, $R^2$, $R^3$, or $Y^1$ is present, they are independent of each other, $$Ti(OR^7)_d X^1{}_{(4-d)} \qquad (3)$$

in the formula (3), d is a real number of 0 or more and 4 or less; $R^7$ denotes a hydrocarbon group having 1 or more and 20 or less carbon atoms; $X^1$ denotes a halogen atom; and in the case that a plurality of $R^7$ or $X^1$ is present, they are independent of each other.

Examples of the inert hydrocarbon solvent for reaction of (A-1) and (A-2) include, but not limited to, aliphatic hydrocarbons such as butane, pentane, hexane, and heptane; aromatic hydrocarbons such as benzene, toluene, and xylene; and alicyclic hydrocarbons such as cyclopentane, cyclohexane, methylcyclohexane, and decalin.

(A-1) is represented by the formula (2) as a form of a complex compound of organomagnesium soluble in inert hydrocarbon solvents. Here, (A-1) totally encompasses dihydrocarbyl magnesium compounds and complexes of the compound and another metal compound.

In the case of α>0 in the formula (2), the metal atom $M^1$ may be any metal atom belonging to the group 12, the group 13, or the group 14 in the periodic table, and examples thereof include zinc, boron, and aluminum. Among them, aluminum and zinc are preferred. The ratio of magnesium to the metal atom $M^1$ (β/α) is not limited. However, the ratio of magnesium to the metal atom $M^1$ (β/α) is preferably 0.1 or higher and 30 or lower, and more preferably 0.5 or higher and 10 or lower.

Examples of the hydrocarbon group having 2 or more and 20 or less carbon atoms denoted as $R^2$ or $R^3$ in the formula (2) include, but not limited to, alkyl groups, cycloalkyl groups, and aryl groups, more specifically, an ethyl group, a propyl group, a butyl group, a propyl group, a hexyl group, an octyl group, a decyl group, a cyclohexyl group, and a phenyl group. Among them, alkyl groups are preferred.

In the case of α=0 in the formula (2), $R^2$ and $R^3$ preferably satisfy any one of the following group (1), group (2), and group (3).

Group (1): at least one of $R^2$ and $R^3$ denotes a secondary or tertiary alkyl group having four or more and six or less carbon atoms, and preferably $R^2$ and $R^3$ each denote an alkyl group having four or more and six or less carbon atoms and at least one of $R^2$ and $R^3$ denotes a secondary or tertiary alkyl group.

Group (2): $R^2$ and $R^3$ denote alkyl groups having different numbers of carbon atoms, and preferably $R^2$ denotes an alkyl group having two or three carbon atoms and $R^3$ denotes an alkyl group having four or more carbon atoms.

Group (3): at least one of $R^2$ and $R^3$ denotes an alkyl group having six or more carbon atoms, and preferably $R^2$ and $R^3$ each denote an alkyl group with the proviso that the sum total of the number of carbon atoms of the hydrocarbon group denoted as $R^2$ and the number of carbon atoms of the hydrocarbon group denoted as $R^3$ is 12 or more.

Examples of the secondary or tertiary alkyl group having four or more and six or less carbon atoms in the group (1) include, but not limited to, a 1-methylpropyl group, a 2-methylpropyl group, a 1,1-dimethylethyl group, a 2-methylbutyl group, a 2-ethylpropyl group, a 2,2-dimethylpropyl group, a 2-methylpentyl group, a 2-ethylbutyl group, a 2,2-dimethylbutyl group, and a 2-methyl-2-ethylpropyl group. Among them, a 1-methylpropyl group is preferred. In the case of α=0 in the formula (2) and $R^2$ is, for example, a 1-methylpropyl group, (A-1) is soluble in inert hydrocarbon solvents, and use of such (A-1) is also likely to provide a preferred result.

Examples of the alkyl group having two or three carbon atoms in the group (2) include, but not limited to, an ethyl group, a 1-methylethyl group, and a propyl group. Among them, an ethyl group is preferred. Examples of the alkyl group having four or more carbon atoms include, but not limited to, a butyl group, a pentyl group, a hexyl group, a heptyl group, and an octyl group. Among them, a butyl group and a hexyl group are preferred.

Examples of the hydrocarbon group having six or more carbon atoms in the group (3) include, but not limited to, a hexyl group, a heptyl group, an octyl group, a nonyl group, a decyl group, a phenyl group, and a 2-naphthyl group. Among them, alkyl groups are preferred, and among alkyl groups, a hexyl group and an octyl group are more preferred.

In general, an alkyl group having a larger number of carbon atoms tends to be highly soluble in inert hydrocarbon solvents, and the viscosity of the solution tends to be higher. In view of this, it is preferred for handling to use an alkyl group having a moderate number of carbon atoms. (A-1) can be diluted with an inert hydrocarbon solvent before use, and the solution can be used without any difficulty even if a trace amount of a Lewis base compound such as an ether, an ester, and an amine is contained or remains in the solution.

In the formula (2), $Y^1$ denotes any of an alkoxy group, a siloxy group, an allyloxy group, an amino group, an amide group, $-N=CR^4R^5$, $-SR^6$, and a β-keto acid residue. Here, $R^4$, $R^5$, and $R^6$ each independently denote a hydrocarbon group having 1 or more and 20 or less carbon atoms. $Y^1$ is preferably an alkoxy group or a siloxy group.

Examples of the alkoxy group include, but not limited to, a methoxy group, an ethoxy group, a propoxy group, a 1-methylethoxy group, a butoxy group, a 1-methylpropoxy group, a 1,1-dimethylethoxy group, a pentoxy group, a hexoxy group, a 2-methylpentoxy group, a 2-ethylbutoxy group, a 2-ethylpentoxy group, a 2-ethylhexoxy group, a 2-ethyl-4-methylpentoxy group, a 2-propylheptoxy group, a 2-ethyl-5-methyloctoxy group, an octoxy group, a phenoxy group, and a naphthoxy group. Among them, a butoxy group, a 1-methylpropoxy group, a 2-methylpentoxy group, and a 2-ethylhexoxy group are preferred.

Examples of the siloxy group include, but not limited to, a hydrodimethylsiloxy group, an ethylhydromethylsiloxy group, a diethylhydrosiloxy group, a trimethylsiloxy group, an ethyldimethylsiloxy group, a diethylmethylsiloxy group, and a triethylsiloxy group. Among them, a hydrodimethylsiloxy group, an ethylhydromethylsiloxy group, a diethylhydrosiloxy group, and a trimethylsiloxy group are preferred.

Preferably, $R^4$, $R^5$, and $R^6$ each independently denote an alkyl group having 1 or more and 12 or less carbon atoms or aryl group, and more preferably, $R^4$, $R^5$, and $R^6$ each independently denote an alkyl group having 3 or more and 10 or less carbon atoms or aryl group. Examples of the alkyl group having 1 or more and 12 or less carbon atoms or aryl group include, but not limited to, a methyl group, an ethyl group, a propyl group, a 1-methylethyl group, a butyl group, a 1-methylpropyl group, a 1,1-dimethylethyl group, a pentyl group, a hexyl group, a 2-methylpentyl group, a 2-ethylbutyl group, a 2-ethylpentyl group, a 2-ethylhexyl group, a 2-ethyl-4-methylpentyl group, a 2-propylheptyl group, a 2-ethyl-5-methyloctyl group, an octyl group, a nonyl group, a decyl group, a phenyl group, and a naphthyl group. Among them, a butyl group, a 1-methylpropyl group, a 2-methylpenty group, and a 2-ethylhexyl group are preferred.

In the formula (2), (nα+2β=a+b+c) as the relation among α, β, a, b, and c represents the stoichiometry between the valences of the metal atoms and the substituents.

For (A-1), The range of the composition ratio by mole $(c/(\alpha+\beta))$ of $Y^1$ to the total metal atoms is 0 or higher and 2 or lower, and preferably 0 or higher and lower than 1. The configuration in which the composition ratio by mole is 2 or lower can improve the reactivity of (A-1) to (A-2).

In the present embodiments, the method for synthesizing (A-1) is not limited. To synthesize (A-1), for example, an organomagnesium compound represented by the formula: $R^2MgX^1$ or the formula: $R^2{}_2Mg$, wherein $R^2$ is the same as in the formula (2) and $X^1$ denotes a halogen atom, and an organometal compound represented by the formula: $M^1R^3{}_n$ or the formula: $M^1R^3{}_{(n-1)}H$, wherein $M^1$, $R^3$, and n are the same as in the formula (2), are reacted in an inert hydrocarbon solvent at 25° C. or higher and 150° C. or lower; and further, if necessary, the resultant is then reacted with a compound represented by the formula: $Y^1$—H, wherein $Y^1$ is the same as in the formula (2), or reacted with an organomagnesium compound and/or organoaluminum compound having a functional group represented by the formula: $Y^1$. In the case that an organomagnesium compound soluble in inert hydrocarbon solvents and a compound represented by the formula: $Y^1$—H are reacted in this method, the order of reaction is not limited, and examples of the method for reaction include a method of adding the compound represented by the formula: $Y^1$—H into the organomagnesium compound, a method of adding the organomagnesium compound into the compound represented by the formula: $Y^1$—H, and a method of adding both compounds simultaneously.

(A-2) is preferably titanium tetrachloride. One (A-2) may be used singly, or two or more (A-2) may be used in combination.

Examples of the hydrocarbon group having 1 or more and 20 or less carbon atoms denoted as $R^7$ include, but not limited to, aliphatic hydrocarbon groups such as a methyl group, an ethyl group, a propyl group, a butyl group, a pentyl group, a hexyl group, a 2-ethylhexyl group, a heptyl group, an octyl group, a decyl group, and an allyl group; alicyclic hydrocarbon groups such as a cyclohexyl group, a 2-methylcyclohexyl group, and a cyclopentyl group; and aromatic hydrocarbon groups such as a phenyl group and a naphthyl group. Among them, aliphatic hydrocarbon groups are preferred. d is a real number of 0 or more and 1 or less, and preferably 0. Examples of the halogen atom denoted as $X^1$ include a chlorine atom, a bromine atom, and an iodine atom. Among them, chlorine is preferred.

Reaction of (A-1) and (A-2) is performed preferably in an inert hydrocarbon solvent, and more preferably in an aliphatic hydrocarbon solvent such as hexane and heptane. The mole ratio between (A-1) and (A-2) in the reaction is not limited. However, the mole ratio of Ti atoms contained in (A-2) to Mg atoms contained in (A-1) (Ti/Mg) is preferably 0.1 or higher and 10 or lower, and more preferably 0.3 or higher and 3.0 or lower.

The reaction temperature is not limited. However, the reaction temperature is preferably −80° C. or higher and 150° C. or lower, and more preferably −40° C. or higher and 100° C. or lower. The stirring speed in the reaction is not limited. However, the Reynolds number is preferably $1.0\times10^5$ or higher and $5.0\times10^6$ or lower, and more preferably $2.0\times10^5$ or higher and $2.5\times10^6$ or lower.

The order of addition of (A-1) and (A-2) is not limited, and examples of the method of addition include a method in which (A-1) is added and then (A-2) is added, a method in which (A-2) is added and then (A-1) is added, and a method in which (A-1) and (A-2) are added simultaneously. Preferred is the method in which (A-1) and (A-2) are added simultaneously. Regarding the interval for addition of (A-1) and (A-2), continuous addition and intermittent addition are both applicable. However, intermittent addition with a periodic interval of 3 minutes or longer and 20 minutes or shorter is preferred, and intermittent addition with a periodic interval of 5 minutes or longer and 15 minutes or shorter is more preferred. The duration for addition of (A-1) and (A-2) is not limited. However, the duration for addition of (A-1) and (A-2) is preferably 1.0 hour or longer and 10 hours or shorter, and more preferably 2.0 hours or longer and 5 hours or shorter.

The duration for aging of (A-1) and (A-2) is not limited. However, aging is preferably performed, for example, for 1.0 hour or longer and 10 hours or shorter, and more preferably performed for 2.0 hours or longer and 5.0 hours or shorter. When (A-1) and (A-2) are reacted in the above-described manner, catalytic active sites of a catalyst obtained in the reaction tend to disperse more homogeneously, and further the agglomeration of catalytic active sites in a solid catalyst is likely to be prevented. As a result, the occurrence of the growth of the polymer chain is not localized, and the surface of a catalyst particle is evenly covered with the polymer chain, and thus a polyethylene powder with a smaller pore volume can be provided, and the polyethylene powder has a proper specific surface area with surface unevenness and reduced inner voids in combination.

After the reaction of (A-1) and (A-2), it is preferred to remove unreacted (A-1) and (A-2). Through removal of unreacted (A-1) and (A-2), for example, generation of a polymer with a deformed shape such as a lump, attachment to the surface of a wall in a reactor, and clogging of extraction piping can be prevented, which results in superiority in continuous production. In removal of unreacted (A-1) and (A-2), for example, a cycle is repeated in which a supernatant is extracted from the solution in which a precipitated catalyst slurry is present and a fresh inert hydrocarbon solvent is added, and thus unreacted matter can be reduced. Alternatively, unreacted matter can be removed through filtration with a filter or the like. Regarding the amount of residual unreacted matter after removal, for example, it is preferred to reduce the residual chlorine concentration derived from (A-2) to 1.0 mmol/L or less.

In the present embodiments, the solid catalyst component [A] obtained in the above reaction is used in a state of a slurry solution with an inert hydrocarbon solvent.

Another example of the above-described particular Ziegler-Natta catalyst is a catalyst for polymerization of olefin, the catalyst consisting of a solid catalyst component [C] and an organometal compound component [B]. The solid catalyst component [C] is produced, for example, through reacting an organomagnesium compound (C-1) which is soluble in inert hydrocarbon solvents and represented by the following formula (4) (hereinafter, also referred to as "(C-1)", simply) and an chlorinating agent (C-2) represented by the following formula (5) (hereinafter, also referred to as "(C-2)", simply) to prepare a carrier (C-3) (hereinafter, also referred to as "(C-3)", simply), and allowing (C-3) to support thereon an organomagnesium compound (C-4) which is represented by the above formula (2) and soluble in inert hydrocarbon solvents (the same compound as (A-1), hereinafter, also referred to as "(C-4)", simply) and a titanium compound (C-5) which is represented by the above formula (3) (the same compound as (A-2), hereinafter, also referred to as "(C-5)", simply):

$$(M^2)_\gamma (Mg)_\delta (R^8)_e (R^9)_f (OR^{10})_g \quad (4)$$

in the formula (4), $M^2$ denotes a metal atom belonging to the group 12, the group 13, or the group 14 in the periodic table; $R^8$, $R^9$, and $R''$ each independently denote a hydrocarbon group having 1 or more and 20 or less carbon atoms; $\gamma$, $\delta$, e, f, and g are each a real number and they satisfy $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e+f+g$, wherein k denotes the valence of $M^2$; and in the case that a plurality of $M^2$, $R^8$, $R^9$, or $R''$ is present, they are independent of each other,

$$H_h SiCl_i R^{11}{}_{(4-(h+i))} \quad (5)$$

in the formula (5), $R^{11}$ denotes a hydrocarbon group having 1 or more and 12 or less carbon atoms; h and i are each a real number and they satisfy $0 < h$, $0 < i$, and $0 < h+i \leq 4$; and in the case that a plurality of $R^{11}$ is present, they are independent of each other.

For (C-4), the same organomagnesium compound as for (A-1) can be used, and for (C-5), the same titanium compound as for (A-2) can be used. The formula (2) and the formula (3) for (C-4) and (C-5) are as described above for (A-1) and (A-2).

Although (C-1) is represented as a form of a complex compound of an organomagnesium soluble in inert hydrocarbon solvents, (C-1) totally encompasses dihydrocarbyl magnesium compounds and complexes of the compound and another metal compound.

Examples of the hydrocarbon group having 1 or more and 20 or less carbon atoms denoted as $R^8$ or $R^9$ in the formula (4) include, but not limited to, alkyl groups, cycloalkyl groups, and aryl groups, more specifically, a methyl group, an ethyl group, a propyl group, a butyl group, a propyl group, a hexyl group, an octyl group, a decyl group, a cyclohexyl group, and a phenyl group. Among them, alkyl groups are preferred.

In the case of $\alpha > 0$ in the formula (4), the metal atom $M^2$ may be any metal atom belonging to the group 12, the group 13, or the group 14 in the periodic table, and examples thereof include a zinc atom, a boron atom, and an aluminum atom. Among them, an aluminum atom and a zinc atom are preferred.

The ratio of magnesium to the metal atom $M^2$ ($\delta/\gamma$) is not limited. However, the ratio of magnesium to the metal atom $M^2$ ($\delta/\gamma$) is preferably 0.1 or higher and 30 or lower, and more preferably 0.5 or higher and 10 or lower.

In the case of $\gamma = 0$ in the formula (4), $R^8$ and $R^9$ preferably satisfy any one of the following group (4), group (5), and group (6).

Group (4): at least one of $R^8$ and $R^9$ denotes a secondary or tertiary alkyl group having four or more and six or less carbon atoms, and preferably $R^8$ and $R^9$ each denote an alkyl group having four or more and six or less carbon atoms and at least one of $R^8$ and $R^9$ denotes a secondary or tertiary alkyl group.

Group (5): $R^8$ and $R^9$ denote alkyl groups having different numbers of carbon atoms, and preferably $R^8$ denotes an alkyl group having two or three carbon atoms and $R^9$ denotes an alkyl group having four or more carbon atoms.

Group (6): at least one of $R^8$ and $R^9$ denotes an alkyl group having six or more carbon atoms, and preferably $R^8$ and $R^9$ each denote an alkyl group with the proviso that the sum total of the number of carbon atoms of the hydrocarbon group denoted as $R^8$ and the number of carbon atoms of the hydrocarbon group denoted as $R^9$ is 12 or more.

Examples of the secondary or tertiary alkyl group having four or more and six or less carbon atoms in the group (4) include, but not limited to, a 1-methylpropyl group, a 2-methylpropyl group, a 1,1-dimethylethyl group, a 2-methylbutyl group, a 2-ethylpropyl group, a 2,2-dimethylpropyl group, a 2-methylpentyl group, a 2-ethylbutyl group, a 2,2-dimethylbutyl group, and a 2-methyl-2-ethylpropyl group. Among them, a 1-methylpropyl group is preferred. In the case of γ=0 in the formula (4) and $R^8$ is, for example, a 1-methylpropyl group, (C-1) is soluble in inert hydrocarbon solvents, and use of such (C-1) is also likely to provide a preferred result.

Examples of the alkyl group having two or three carbon atoms in the group (5) include, but not limited to, an ethyl group, a 1-methylethyl group, and a propyl group. Among them, an ethyl group is preferred. Examples of the alkyl group having four or more carbon atoms include, but not limited to, a butyl group, a pentyl group, a hexyl group, a heptyl group, and an octyl group. Among them, a butyl group and a hexyl group are preferred.

Examples of the alkyl group having six or more carbon atoms in the group (6) include, but not limited to, a hexyl group, a heptyl group, an octyl group, a nonyl group, a decyl group, a phenyl group, and 2-naphthyl group. Among them, alkyl groups are preferred, and among alkyl groups, a hexyl group and an octyl group are more preferred.

In general, an alkyl group having a larger number of carbon atoms tends to be highly soluble in inert hydrocarbon solvents, and the viscosity of the solution tends to be higher. In view of this, it is preferred for handling to use an alkyl group having a moderate number of carbon atoms. (C-1) can be diluted with an inert hydrocarbon solvent before use, and the solution can be used without any difficulty even if a trace amount of a Lewis base compound such as an ether, an ester, and an amine is contained or remains in the solution.

In the formula (4), the hydrocarbon group having 1 or more and 20 or less carbon atoms denoted as $R^{10}$ is preferably an alkyl group having 1 or more and 12 or less carbon atoms or aryl group, and more preferably an alkyl having 3 or more and 10 or less carbon atoms or aryl group. Examples of the hydrocarbon group having 1 or more and 20 or less carbon atoms include, but not limited to, a methyl group, an ethyl group, a propyl group, a 1-methylethyl group, a butyl group, a 1-methylpropyl group, a 1,1-dimethylethyl group, a pentyl group, a hexyl group, a 2-methylpentyl group, a 2-ethylbutyl group, a 2-ethylpentyl group, a 2-ethylhexyl group, a 2-ethyl-4-methylpentyl group, a 2-propylheptyl group, a 2-ethyl-5-methyloctyl group, an octyl group, a nonyl group, a decyl group, a phenyl group, and a naphthyl group. Among them, a butyl group, a 1-methylpropyl group, a 2-methylpentyl group, and a 2-ethylhexyl group are preferred.

In the formula (4), (kγ+28=e+f+g) as the relation among the symbols γ, δ, e, f, and g represents the stoichiometry between the valences of the metal atoms and the substituents.

The method for synthesizing (C-1) is not limited. However, preferred is a method in which an organomagnesium compound represented by the formula: $R^8MgX^1$ or the formula: $R^8{}_2Mg$, wherein $R^8$ is the same as in the formula (4) and $X^1$ denotes a halogen atom, and an organometal compound represented by the formula: $M^2R^9{}_k$ or the formula: $M^2R^9{}_{(k-1)}H$, wherein $M^2$, $R^9$, and k are the same as in the formula (4), are reacted in an inert hydrocarbon solvent at 25° C. or higher and 150° C. or lower; and further, if necessary, the resultant is subsequently reacted with an alcohol having a hydrocarbon group denoted as $R^9$, wherein $R^9$ is the same as in the formula (4), or an alkoxymagnesium compound and/or alkoxyaluminum compound being soluble in inert hydrocarbon solvents and having a hydrocarbon group denoted as $R^9$. In this method, the order of reaction for an organomagnesium compound soluble in inert hydrocarbon solvents and an alcohol is not limited, and examples of the method for reaction include a method in which the alcohol is added into the organomagnesium compound, a method in which the organomagnesium compound is added into the alcohol, and a method in which both compounds are added simultaneously.

The reaction ratio between the organomagnesium compound and the alcohol is not limited. However, the composition ratio by mole of alkoxy groups to the total metal atoms (g/γ+δ) in an alkoxy group-containing organomagnesium compound resulting from the reaction is 0 or higher and 2.0 or lower, and preferably 0 or higher and lower than 1.0.

(C-2) is a chlorinating agent represented by the formula (5), and is a chlorinated silicon compound having at least one Si—H bond.

Examples of the hydrocarbon group having 1 or more and 12 or less carbon atoms denoted as $R^{11}$ in the formula (5) include, but not limited to, aliphatic hydrocarbon groups, alicyclic hydrocarbon groups, and aromatic hydrocarbon groups, more specifically, a methyl group, an ethyl group, a propyl group, a 1-methylethyl group, a butyl group, a pentyl group, a hexyl group, an octyl group, a decyl group, a cyclohexyl group, and a phenyl group. Among them, alkyl groups having 1 or more and 10 or less carbon atoms are preferred, and alkyl groups having 1 to 3 carbon atoms such as a methyl group, an ethyl group, a propyl group, and a 1-methylethyl group are more preferred.

Each of h and i is a real number of more than 0 and they satisfy (h+i≤4), and i is preferably a real number of 2 or more and 3 or less.

Examples of (C-2) include, but not limited to, $HSiCl_3$, $HSiCl_2CH_3$, $HSiCl_2C_2H_5$, $HSiCl_2$ $(C_3H_7)$, $HSiCl_2(2-C_3H_7)$, $HSiCl_2(C_4H_9)$, $HSiCl_2(C_6H_5)$, $HSiCl_2(4-Cl-C_6H_4)$, $HSiCl_2(CH=CH_2)$, $HSiCl_2(CH_2C_6H_5)$, $HSiCl_2(1-C_{10}H_7)$, $HSiCl_2(CH_2CH=CH_2)$, $H_2SiCl(CH_3)$, $H_2SiCl(C_2H_5)$, $HSiCl(CH_3)_2$, $HSiCl(C_2H_5)_2$, $HSiCl(CH_3)$ $(2-C_3H_7)$, $HSiCl$ $(CH_3)$ $(C_6H_5)$, and $HSiCl(C_6H_5)_2$. Among them, $HSiCl_3$, $HSiCl_2CH_3$, $HSiCl(CH_3)_2$, and $HSiCl_2(C_3H_7)$ are preferred, and $HSiCl_3$ and $HSiCl_2CH_3$ are more preferred. One (C-2) may be used singly, or two or more (C-2) may be used in combination.

In reacting (C-1) and (C-2), it is preferred to dilute (C-2), in advance of use, with an inert hydrocarbon solvent; a chlorinated hydrocarbon such as 1,2-dichloroethane, o-dichlorobenzene, and dichloromethane; an ether solvent such as diethyl ether and tetrahydrofuran; or a mixed solvent of them. Among them, an inert hydrocarbon solvent is more preferred from the viewpoint of the performance of a catalyst.

The reaction ratio between (C-1) and (C-2) is not limited. However, the mole of silicon atoms contained in (C-2) per mole of magnesium atoms contained in (C-1) is preferably 0.01 mol or more and 100 mol or less, and more preferably 0.1 mol or more and 10 mol or less.

The method for reacting (C-1) and (C-2) is not limited, and examples thereof include a method with simultaneous addition in which (C-1) and (C-2) are reacted while they are simultaneously introduced into a reactor, a method in which (C-1) is introduced into a reactor into which (C-2) has been charged in advance, and a method in which (C-2) is introduced into a reactor into which (C-1) has been charged in advance. Among them, preferred is the method in which (C-1) is introduced into a reactor into which (C-2) has been charged in advance. After the carrier (C-3) obtained in the reaction is separated through a filtration or decantation method, the carrier (C-3) is preferably washed with an inert hydrocarbon solvent thoroughly to remove unreacted matter or by-products.

The reaction temperature for (C-1) and (C-2) is not limited. However, the reaction temperature for (C-1) and (C-2) is preferably 25° C. or higher and 150° C. or lower, more preferably 30° C. or higher and 120° C. or lower, and even more preferably 40° C. or higher and 100° C. or lower. The stirring speed during the reaction is not limited. However, the Reynolds number is preferably $1.0 \times 10^5$ or higher and $5.0 \times 10^6$ or lower, and more preferably $2.0 \times 10^5$ or higher and $2.5 \times 10^6$ or lower.

In the method with simultaneous addition in which (C-1) and (C-2) are reacted while they are simultaneously introduced into a reactor, it is preferred to adjust the reaction temperature to a predetermined temperature through adjusting the temperature of a reactor to the predetermined temperature in advance and adjusting the temperature of the inside of the reactor to the predetermined temperature while simultaneous addition is performed. In the method in which (C-1) is introduced into a reactor into which (C-2) has been charged in advance, it is preferred to adjust the reaction temperature to a predetermined temperature through adjusting the temperature of a reactor into which (C-2) has been charged to the predetermined temperature and adjusting the temperature of the inside of the reactor to the predetermined temperature while (C-1) is introduced into the reactor. In the method in which (C-2) is introduced into a reactor into which (C-1) has been charged in advance, the reaction temperature is adjusted to a predetermined temperature through adjusting the temperature of a reactor into which (C-1) has been charged to the predetermined temperature and adjusting the temperature of the inside of the reactor to the predetermined temperature while (C-2) is introduced into the reactor.

Regarding the quantity of (C-4) to be used, the mole ratio of magnesium atoms contained in (C-4) to titanium atoms contained in (C-5) is preferably 0.1 or higher and 10 or lower, and more preferably 0.5 or higher and 5 or lower.

The reaction temperature for (C-4) and (C-5) is not limited. However, the reaction temperature for (C-4) and (C-5) is preferably −80° C. or higher and 150° C. or lower, and more preferably −40° C. or higher and 100° C. or lower.

The concentration of (C-4) in use is not limited. However, the concentration of (C-4) in use is preferably 0.1 mol/L or more and 2 mol/L or less, and more preferably 0.5 mol/L or more and 1.5 mol/L or less, in terms of titanium atoms contained in (C-4). For dilution of (C-4), it is preferred to use an inert hydrocarbon solvent.

The order of addition of (C-4) and (C-5) to (C-3) is not limited, and a method in which (C-4) is added and then (C-5) is added, a method in which (C-5) is added and then (C-4) is added, and a method in which (C-4) and (C-5) are added simultaneously are all applicable. Among them, the method in which (C-4) and (C-5) are added simultaneously is preferred. Reaction of (C-4) and (C-5) is performed in an inert hydrocarbon solvent, and it is preferred to use an aliphatic hydrocarbon solvent such as hexane and heptane for the inert hydrocarbon solvent.

Regarding the interval for addition of (C-4) and (C-5), continuous addition and intermittent addition are both applicable. However, intermittent addition with a periodic interval of 3.0 minutes or longer and 20 minutes or shorter is preferred, and intermittent addition with a periodic interval of 5.0 minutes or longer and 15 minutes or shorter is more preferred, from the viewpoint of control of the surface area of the particle of the polyethylene powder. The duration for addition of (C-4) and (C-5) is not limited. However, the duration for addition of (C-4) and (C-5) is preferably 1.0 hours or longer and 10 hours or shorter, and more preferably 2.0 hours or longer and 5 hours or shorter. The duration for aging of (C-4) and (C-5) is not limited. However, the duration for aging of (C-4) and (C-5) is preferably 1.0 hour or longer and 10 hours or shorter, and more preferably 2.0 hours or longer and 5 hours or shorter. The catalyst obtained in the above reaction is used in a state of a slurry solution with an inert hydrocarbon solvent.

Regarding to the quantity of (C-5) to be used is not limited, the mole ratio to magnesium atoms contained in the carrier (C-3) is preferably 0.01 or higher and 20 or lower, and more preferably 0.05 or higher and 10 or lower. The reaction temperature for (C-3) and (C-5) is not limited. However, the reaction temperature for (C-3) and (C-5) is preferably −80° C. or higher and 150° C. or lower, and more preferably −40° C. or higher and 100° C. or lower. The method for allowing (C-3) to support (C-5) is not limited, and examples thereof include a method in which (C-5) in an excessive quantity relative to that of (C-3) is reacted and a method in which (C-5) is allowed to be supported in an efficient manner by using a third component, and preferred is a method in which supporting is achieved through reaction of (C-5) and the organomagnesium compound (C-4).

The particular Ziegler-Natta catalyst in the present embodiments serves as a highly active polymerization catalyst by virtue of combination of the solid catalyst component [A] or solid catalyst component [C] and an organometal compound component [B]. The organometal compound component [B] is occasionally called "cocatalyst".

Examples of the organometal compound component [B] is not limited, include compounds containing a metal belonging to the group 1, the group 2, the group 12, or the group 13 in the periodic table. Among them, organoaluminum compounds and/or organomagnesium compounds are preferred.

For the organoaluminum compound, a compound represented by a formula (6) is preferably used singly or in a mixture:

$$AlR^{12}{}_j Z^1{}_{(3-j)} \qquad (6)$$

in the formula (6), $R^{12}$ denotes a hydrocarbon group having 1 or more and 20 or less carbon atoms; $Z^1$ denotes a hydrogen atom, a halogen atom, an alkoxy group, an allyloxy group, or a siloxy group; and j is a real number of 2 or more and 3 or less.

Examples of the hydrocarbon group having 1 or more and 20 or less carbon atoms denoted as $R^{12}$ in the formula (6) include, but not limited to, aliphatic hydrocarbon groups, aromatic hydrocarbon groups, and alicyclic hydrocarbon groups.

Examples of the compound represented by the formula (6) include, but not limited to, trialkylaluminum compounds such as trimethylaluminum, triethylaluminum, tripropylaluminum, tributylaluminum, tri(2-methylpropyl)aluminum (also referred to as triisobutylaluminum), tripentylaluminum, tri(3-methylbutyl)aluminum, trihexylaluminum, trioctylaluminum, and tridecylaluminum; halogenated aluminum compounds such as diethylaluminum chloride, ethylaluminum dichloride, bis(2-methylpropyl)aluminum chloride, ethylaluminum sesquichloride, and diethylaluminum bromide; alkoxyaluminum compounds such as diethylaluminum ethoxide and bis(2-methylpropyl)aluminum butoxide; and siloxyaluminum compounds such as dimethylhydrosiloxyaluminum dimethyl, ethylmethylhydrosiloxyaluminum diethyl, and ethyldimethylsiloxyaluminum diethyl. Among them, trialkylaluminum compounds are preferred.

For the organomagnesium compound, an organomagnesium compound which is represented by the above formula (4) as (C-1) and soluble in inert hydrocarbon solvents is preferably used singly or in a mixture.

It is preferred for the organomagnesium compound as the organometal compound component [B], which is the same compound as the organomagnesium compound represented by the formula (4) described above as (C-1), to have higher solubility in inert hydrocarbon solvents, and thus $((\beta/\alpha)$ is preferably in the range of 0.5 or more and 10 or less, and more preferably the organomagnesium compound is a compound in which $M^2$ is aluminum.

The method for adding the solid catalyst component [A] or solid catalyst component [C] and the organometal compound component [B] into the polymerization system under polymerization conditions is not limited, and the two component may be added into the polymerization system separately, or the two components reacted in advance may be added. The ratio between the two components is not limited. However, the quantity of the organometal compound component [B] per gram of the solid catalyst component [A] or [C] is preferably 1 mmol or more and 3000 mmol or less.

Regarding the polymerization method, for example, ethylene or a monomer including ethylene is polymerized (copolymerized) through a suspension polymerization method or a gas-phase polymerization method. Among the polymerization methods, a suspension polymerization method is preferred from the viewpoint that the heat of polymerization can be efficiently removed. In a suspension polymerization method, an inert hydrocarbon medium can be used as a medium, or α-olefin, as a monomer, itself may be used as a medium.

The inert hydrocarbon medium is not limited, and examples thereof include aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures of them.

The polymerization temperature is not limited. However, the polymerization temperature is preferably 30° C. or higher and 100° C. or lower, more preferably 35° C. or higher and 90° C. or lower, and even more preferably 40° C. or higher and 80° C. or lower. The polymerization temperature being 30° C. or higher allows efficient industrial production. The polymerization temperature being 100° C. or lower allows continuous, stable operation.

The polymerization pressure is not limited. However, the polymerization pressure is preferably 0.1 MPa or higher and 2.0 MPa or lower, more preferably 0.1 MPa or higher and 1.5 MPa or lower, and even more preferably 0.1 MPa or higher and 1.0 MPa or lower, from the viewpoint of the average particle size of the polyethylene powder.

Any of a batch mode, a semi-continuous mode, and a continuous mode can be used for polymerization reaction. However, polymerization is preferably performed by using a continuous mode. Polymerization by using a continuous mode, in which ethylene gas, a solvent, a catalyst, and so on are continuously fed into the polymerization system and continuously discharged together with an ethylene polymer (copolymer) generated, can prevent a situation in which a high temperature is partially generated through rapid reaction of ethylene, and thus higher stability can be achieved in the inside of the polymerization system. In addition, feeding ethylene gas, a solvent, a catalyst, and so on at a temperature comparable to the temperature of the inside of a polymerization reactor is also preferred for stabilization of the inside of the system. Through reacting ethylene in a homogeneous system, generation of a branch or a double bond or the like in the polymer chain can be prevented. In addition, the surface deformation or the like of the polyethylene powder due to the decomposition and crosslinking of the ethylene polymer (copolymer) can be prevented. Therefore, preferred is a continuous mode, which makes the inside of the polymerization system more homogeneous. Further, polymerization can be performed in two or more stages with different reaction conditions.

The molecular weight can be controlled within a proper range through addition of a proper concentration of hydrogen in the polymerization system as a chain transfer agent. In addition to molecular weight control, hydrogen added into the polymerization system can inhibit the growth of the polymer through promotion of the chain transfer caused by a catalyst. Thereby, the polymer chain is prevented from rapidly growing, and thus formation of a distorted particle can be prevented. In the case that hydrogen is added into the polymerization system, the mole fraction of hydrogen to the total system is preferably 0 mol % or higher and 30 mol % or lower, more preferably 3.0 mol % or higher and 25 mol % or lower, and even more preferably 5.0 mol % or higher and 20 mol % or lower.

It is more preferred to introduce hydrogen which has been brought into contact with a catalyst in advance from a catalyst-introducing line into the polymerization system. The catalyst concentration near the outlet of an introducing line is high just after a catalyst is introduced into the polymerization system, which forces ethylene to rapidly react, leading to a situation in which a high temperature is partially generated with higher probability. Here, the initial activity of a catalyst can be reduced by contacting the catalyst with hydrogen before introduction into the polymerization system, and thus the change in shape of the particle of the polyethylene powder having a high temperature due to rapid polymerization can be prevented in the initial stage of polymerization.

The method for deactivating the Ziegler-Natta catalyst used to synthesize the polyethylene powder is not limited. However, it is preferred to perform deactivation after the polyethylene powder and the solvent are separated to some extent. Low-molecular-weight components remaining in the solvent can be reduced through introducing an agent for deactivation of the catalyst after being separated from the solvent, and thus the crystal structure in the molecule can be homogenized.

In solvent separation process, the fraction of the solvent remaining in the polyethylene slurry is preferably 10% by mass or more and 60% by mass or less, more preferably 15% by mass or more and 55% by mass or less, and even more preferably 20% by mass or more and 50% by mass or less, from the viewpoint of control of the melting endotherm of the polyethylene powder. By virtue of the fraction of the solvent being 10% by mass or more, the surface tension of the particle of the polyethylene powder is prevented from increasing, and a deactivating agent can permeate in the particle without any difficulty in catalyst-deactivating process, and thus the probability of the occurrence of uneven deactivation can be lowered. By virtue of the fraction of the solvent being 60% by mass or less, the amount of low-molecular-weight components remaining in the polyethylene powder is prevented from increasing, and easily soluble sites are not localized in the polymer, and thus homogeneous solubility and gradual melting behavior can be provided.

The deactivating agent for the catalytic system is not limited, and examples thereof include oxygen, water, alcohols, glycols, phenols, carbon monoxide, carbon dioxide, ethers, carbonyl compounds, and alkynes.

The drying temperature after separation of the solvent is not limited. However, the drying temperature after separation of the solvent is preferably 60° C. or higher and 150° C. or lower, more preferably 70° C. or higher and 140° C. or lower, and even more preferably 80° C. or higher and 130° C. or lower, from the view point of controlling the surface area of the polyethylene powder. The drying temperature being 60° C. or higher allows efficient drying. The drying temperature being 150° C. or lower allows drying while the decomposition and crosslinking of the ethylene polymer is suppressed, and the polyethylene powder is not exposed to a surrounding environment of a temperature higher than or equal to its melting point, and thus the particle can be prevented from partially melting. Further, rearrangement of the crystal structure is less likely to occur in various portions, in particular, the outermost surface of the polyethylene powder, and thus the crystal structure in the molecule can be homogenized. Furthermore, prevented is a situation in which interparticle collision of the polyethylene powder occurs while the surface of the polyethylene powder is melting and the polyethylene powder is transported while being fused together, and thus increase of the average particle size due to formation of a macromolecule can be prevented.

[Fiber]

The polyethylene powder according to the present embodiments is preferably used for a fiber. The polyethylene powder according to the present embodiments can be processed into a fiber by using a common spinning method. For example, the polyethylene powder is extruded into a gel by using an extruder with a circular die in accordance with a wet method with a solvent, and a processing method including stretching, extraction, and drying in the order presented is applied to the gel to obtain a thread, and a processing method including stretching is further applied to the thread to obtain a fiber.

[Molded Article]

A molded article can be obtained through molding of the polyethylene powder according to the present embodiments. Such a molding product can be obtained through injection molding, extrusion molding, pressing, or the like. Even in the case of a molecular weight such that melt molding only with polyethylene is difficult, a molded article can be obtained in accordance with a common molding method through gelling with a solvent or the like. Examples of molded articles include films, sheets, microporous membranes for battery separators, and sintered filters.

[Applications]

The polyethylene powder according to the present embodiments quickly dissolves in a solvent with less generation of undissolved matter, and has satisfactory flowability and spinning stability. Accordingly, the polyethylene powder according to the present embodiments can be suitably used for a starting material of a fiber requiring high strength, or a starting material of a battery separator requiring a homogeneous and thin microporous membrane structure. Fibers derived from the polyethylene powder according to the present embodiments are industrially applicable to a wide variety of applications such as high-performance textiles such as sports clothes, bulletproof or protective clothes and protective gloves, and safety supplies; rope products such as tag ropes and mooring ropes, yacht ropes, and construction ropes; braided cord products such as fishlines and blind cables; net products such as fishing nets and protective nets for ball sports; reinforcing materials such as chemical filters and battery separators; screen materials such as nonwoven fabrics and canvas; reinforcing fibers for sports such as helmets and skis, and reinforcing fibers for speaker cones, prepregs, and concrete reinforcing.

EXAMPLES

Hereinafter, the present embodiments will be described in more detail with reference to specific Examples and Comparative Examples below. However, the present embodiments are not limited to Examples and Comparative Examples below at all and, may be modified without departing from the gist. Measurement of physical properties and evaluation in Examples and Comparative Examples described later were performed in accordance with the following methods.

(Physical Property 1) Specific Surface Area

The specific surface area of a sample of a polyethylene powder was determined by the BET method. The specific surface area was measured with an "Autosorb 3MP" (trade name) manufactured by Yuasa Ionics Inc. As pretreatment, 1 g of a polyethylene powder is placed in a sample cell, and heated to degas in a sample pretreatment apparatus at 80° C. and 0.01 mmHg or lower for 12 hours. Thereafter, measurement was performed by the BET method with nitrogen as an adsorption gas at a measurement temperature of −196° C.

(Physical Property 2) Pore Volume

The pore volume of a sample of a polyethylene powder was determined by mercury penetration method. The pore volume and pore distribution were measured with an "AutoPore IV 9500" (trade name) manufactured by Shimadzu Corporation as a mercury porosimeter. As pretreatment, 0.5 g of a polyethylene powder was placed in a sample cell and degassed and dried in a low-pressure measurement section at normal temperature, and then the sample container was filled with mercury. The sample container was gradually pressurized to inject the mercury into pores of the sample. The pressure conditions were set as in the following.

low-pressure section: measured at 69 Pa (0.01 psia) $N_2$ pressure high-pressure section: 21 to 228 MPa (3000 to 33000 psia)

(Physical Property 3) Full Width at Half Maximum of Melting Endothermic Peak

The full width at half maximum of melting endothermic peak of a sample of a polyethylene powder was measured with a differential scanning calorimeter (DSC) (Perkin Elmer Pyris1 DSC). With an electronic balance, 8.4 g (8.3 to 8.5 g) of a sample was weighed out. Then, the sample was placed in an aluminum sample pan. An aluminum cover was attached to the pan, which was set in the differential scanning calorimeter. The sample and reference sample were retained at 50° C. for 1 minute while nitrogen purge was performed at a flow rate of 20 mL/min, then heated from 50° C. to 180° C. at a heating rate of 10° C./min, retained at 180° C. for 5 minutes, and then cooled to 50° C. at a cooling rate of 10° C./min. A base line was drawn from 60° C. to 155° C. in the melting curve acquired during the process, and the full width at half maximum of a melting endothermic peak was derived with the analysis software "Pyris software (version 7)" (trade name).

(Physical Property 4) Viscosity-Average Molecular Weight (Mv)

The viscosity-average molecular weight (Mv) of a sample of a polyethylene powder was determined by using the following method in accordance with ISO 1628-3 (2010). First, 20 mg of a polyethylene powder was weighed out into a melting tube, and the melting tube was subjected to nitrogen purge, and then 20 mL of decahydronaphthalene (with 1 g/L of 2,6-di-t-butyl-4-methylphenol added) was added thereto, and the resultant was stirred at 150° C. for 2 hours to dissolve the polyethylene powder. The solution was placed in a thermostatic chamber at 135° C., and the efflux time ($t_s$) required for falling between reference lines was measured with a Cannon-Fenske viscometer (manufactured by Shibata Sci. And Tech. Ltd.: product number-100). Similarly, the efflux time ($t_s$) required for falling between reference lines was measured for samples with 10 mg, 5 mg, and 2 mg of the polyethylene powder. As a blank, the efflux time ($t_s$) was measured for single decahydronaphthalene without the polyethylene powder. The reduced viscosities ($\eta_{sp}/C$) of the polyethylene powder determined by using an equation below were plotted to derive a linear equation between concentration (C) (unit: g/dL) and reduced viscosity ($\eta_{sp}/C$) for the polyethylene powder, and the limiting viscosity ($[\eta]$) was determined through extrapolation of the line to the concentration 0.

$$\eta_{sp}/C=(t_s/t_b-1)/0.1: \text{(unit: dL/g)}$$

Subsequently, the value of limiting viscosity ($[\eta]$) was applied to the following equation to calculate the viscosity-average molecular weight (Mv).

$$Mv=(5.34\times10^4)\times[\eta]^{1.49}$$

(Physical Property 5) Average Particle Size

To determine the average particle size of a polyethylene powder, 100 g of a polyethylene powder was classified with 10 types of sieves defined in JIS Z8801 (mesh size: 710 μm, 500 μm, 425 μm, 355 μm, 300 μm, 212 μm, 150 μm, 106 μm, 75 μm, 53 μm), and the masses of the polyethylene powder remaining in the sieves were integrated from the smallest mesh size to obtain an integral curve, and the particle size at the integrated mass value of 50% was determined as the average particle size.

(Physical Property 6) Ratio of Number of Particular Particles X (Particles Having Aspect Ratio of 0.66 or Larger and 0.84 or Smaller) and Ratio of Number of Particular Particles Y (Particles Having Degree of Unevenness of 0.95 or Higher)

The ratio of the number of particular particles X and that of particular particles Y were determined for a sample of a polyethylene powder as follows. The aspect ratio and degree of unevenness (UD) were measured with the dynamic imaging particle size distribution/particle shape analyzer "QICPIC" (trade name) manufactured by Japan Laser Corp. A sample was dispersed with a dry disperser of air flow type as set forth below, and images of 4500 to 40000 particles were continuously taken and incorporated, and the ratio of the number of particular particles X and that of particular particles Y were determined with information from the incorporated images by using image analysis software. Note that the number of particles does not affect the values of aspect ratio and degree of unevenness (UD) as long as the number of particles is within the above range. The other measurement conditions were set as below. Specifically, the aspect ratio and degree of unevenness were determined as described below.

Disperser of air flow: RODOS™ (manufactured by Japan Laser Corp., trade name)
Dispersing pressure of compressed air flow: 1.0 bar
Analysis mode: EQPC (diameter of a circle of equal projection area)
Measurement range for analysis: M6 (minimum pixel size: 5 μm)

(Aspect Ratio)

The obtained particle of interest was exactly sandwiched between a pair of parallel lines in a certain direction and the interval therebetween was measured for various directions, and the maximum interval was determined as Fmax and the minimum interval was determined as Fmin, and the aspect ratio was determined for all particles by using an equation below. After the aspect ratio was determined for all particles, a particle having an aspect ratio in a particular range (0.66 or larger and 0.84 or smaller) was regarded as a particular particle X, and the ratio of the number of particular particles X to the total number of the particles of interest was determined.

$$\text{Aspect ratio}=F\text{min}/F\text{max}$$

(Degree of Unevenness)

The project area of the obtained particle of interest was defined as A, and the projected area enclosed in an envelope connecting vertexes of the particle of interest was defined as (A+B), and UD represented by a formula (1) below was used as the degree of unevenness of the particle. After the degree of unevenness was determined for all particles, a particle having a degree of unevenness in a particular range (0.95 or higher) was regarded as a particular particle Y, and the ratio of the number of particular particles Y to the total number of the particles of interest was determined.

$$UD=A/(A+B) \qquad (1)$$

(Physical Property 7) Angle of Repose

The angle of repose of a polyethylene powder was measured with a Powder Tester PT-X manufactured by HOSOKAWA MICRON CORPORATION under the following conditions.

A program for measurement of an angle of repose in the software was selected, and accessary members were attached to the main apparatus.

Onto a sieve with a mesh size of 710 μm, 200 mL of a powder was charged, and vibration conditions were set to amplitude: 1.5 mm, vibration time: 170 seconds, slow-down time: 10 seconds. Vibration was initiated, and it was confirmed that the sample completely passed through the sieve onto a bottom tray, and was ready for measurement of the angle of repose.

Then, the mode for angle measurement was set to "Ridgeline Average" in accordance with the indication of the software, and the angle of repose was determined.

(Evaluation 1) Dissolution Rate

A mixture of 14 g of a polyethylene powder, 0.4 g of pentaerythrityl-tetrakis[3-(3,5-di-t-butyl-4-hydroxyphenyl)propionate] as an antioxidant, and 36 g of liquid paraffin (manufactured by MATSUMURA OIL Co., Ltd., trade name "P-350") was charged into a compact kneader (manufactured by Toyo Seiki Seisaku-sho, Ltd., trade name "LABO PLASTOMILL 30C150"), and kneaded at 200° C. and a screw rotation rate of 50 rpm. The kneading time was 10 minutes. The kneaded product was sandwiched between metal sheets, and the resultant was subjected to heat press with a compression molding machine (manufactured by SHINTO Metal Industries Corporation, trade name "SFA- 37") at 190° C. until the thickness reached 1 mm, and the resulting sheet was then quickly cooled at 25° C. to form a gel sheet.

The resulting gel sheet was stretched at draw ratios of 7×7 with a simultaneous biaxial stretching machine at 120° C., and then the liquid paraffin was removed through extraction with methylene chloride, and thereafter the resultant was dried. Unintended objects having a size of 50 μm or larger present in an area of 250 mm×250 mm in the formed sheet (objects observed as dark spots when the stretched sheet was observed with transmitted light) were visually counted with the naked eye, and undissolved matter of the polyethylene powder was evaluated by the number of unintended objects. The dissolution rate was evaluated on the basis of the following evaluation criteria.

(Evaluation Criteria)

◎: the number of unintended objects was one or less.

○: the number of unintended objects was two or more and 4 or less.

x: the number of unintended objects was five or more.

(Evaluation 2) Undissolved Matter

A mixture of 14 g of a polyethylene powder, 0.4 g of pentaerythrityl-tetrakis[3-(3,5-di-t-butyl-4-hydroxyphenyl)propionate] as an antioxidant, and 36 g of liquid paraffin (manufactured by MATSUMURA OIL Co., Ltd., trade name "P-350") was charged into a compact kneader (manufactured by Toyo Seiki Seisaku-sho, Ltd., trade name "LABO PLASTOMILL 30C150"), and kneaded at 200° C. and a screw rotation rate of 50 rpm. The kneading time was 20 minutes. The kneaded product was sandwiched between metal sheets, and the resultant was subjected to heat press with a compression molding machine (manufactured by SHINTO Metal Industries Corporation, trade name "SFA-37") at 190° C. until the thickness reached 1 mm, and the resulting sheet was then quickly cooled at 25° C. to form a gel sheet.

The resulting gel sheet was stretched at draw ratios of 7×7 with a simultaneous biaxial stretching machine at 120° C., and then the liquid paraffin was removed through extraction with methylene chloride, and thereafter the resultant was dried. Unintended objects having a size of 50 μm or larger present in an area of 250 mm×250 mm in the resulting formed sheet (objects observed as dark spots when the stretched sheet was observed with transmitted light) were visually counted with the naked eye, and undissolved matter of the polyethylene powder was evaluated by the number of unintended objects which was based on the following evaluation criteria.

(Evaluation Criteria)

◎: the number of unintended objects was one or less.

○: the number of unintended objects was two or more and 4 or less.

x: the number of unintended objects was five or more.

(Evaluation 3) Flowability

By using a funnel of an apparatus for bulk specific gravity measurement described in JIS K-6721: 1997, the efflux time required for 50 g of a polyethylene powder to fall completely was measured, and the flowability of the polyethylene powder was evaluated on the basis of the following criteria.

(Evaluation Criteria)

◎: the efflux time was shorter than 30 seconds.

○: the efflux time was 30 seconds or longer and shorter than 40 seconds.

x: the efflux time was 40 seconds or longer, or the polyethylene powder fell non-continuously, or did not fall.

(Evaluation 4) Spinning Stability

A polyethylene powder (95% by mass based on the total quantity) to which 500 ppm by mass of n-octadecyl-3-(4-hydroxy-3,5-di-t-butylphenyl)propionate had been added as an antioxidant was blended with decalin (manufactured by Hiroshima Wako Co., Ltd.) (5% by mass based on the total quantity) to prepare a slurry liquid. The slurry liquid prepared was charged into an extruder with the temperature set at 280° C. to form a homogeneous solution. Then, the retention time was 20 minutes. Subsequently, the solution was spun by using a spinneret having a hole diameter of 0.7 mm with the temperature set at 180° C. at a discharge rate of 1.1 g/min/hole. The discharged thread containing the solvent was charged into a water bath at 10° C. via a 3 cm air gap, and wound up at a speed of 40 m/min while being quickly cooled.

This spinning process was continuously performed for 2 hours. When thread breakage occurred during the spinning process, the case was counted, and spinning was continued again. Then, the time required to restart spinning was excluded so that the net continuous operation time amounted to 2 hours. This 2-hour successive operation was performed twice, and the average value of the numbers of thread breakages was calculated. From the average number of thread breakages, the spinning stability was evaluated on the basis of the following evaluation criteria.

(Evaluation Criteria)

◎: the average number of thread breakages was 0.

○: the average number of thread breakages was more than 0 and 1.5 or less.

x: the average number of thread breakages was more than 1.5.

(Evaluation 5) Filler Dispersibility

A mixture of 2.5 g of a polyethylene powder, 0.0125 g of the carbon nanotube Pyrograf III, 0.5 g of pentaerythrityl-tetrakis[3-(3,5-di-t-butyl-4-hydroxyphenyl)propionate] as an antioxidant, and 47.5 g of liquid paraffin (manufactured by MATSUMURA OIL Co., Ltd., trade name "P-350") was charged into a compact kneader (manufactured by Toyo Seiki Seisaku-sho, Ltd., trade name "LABO PLASTOMILL 30C150"), and kneaded at a screw rotation rate of 50 rpm with the kneading temperature changed in three steps. In the first step, kneading was performed for 15 minutes at a temperature of Tc+10° C., where Tc is the crystallization temperature of the polyethylene used; in the second step, kneading was performed while the temperature was changed so that the temperature was constantly elevated from the temperature set in the first step to 200° C. in 40 minutes; and in the third step, kneading was performed at 200° C. for 10 minutes. The kneaded product was allowed to pass through an orifice having an aperture of 1 mm and a length of 9.99 mm in a Capirograph 1D manufactured by Toyo Seiki Seisaku-sho, Ltd., heated to 190° C., and wound up into a fiber at an extrusion speed of 10 mm/min and a take-up speed of 3 m/min. The resulting gel fiber was subjected to two cycles of extraction in each of which the gel fiber was soaked in hexane for 1 hour to extract the liquid paraffin, and then left to stand and dried at room temperature for 1 day.

The resulting unstretched thread was subjected to primary stretching by using an ORIENTEC RTC-1310A, a tensile tester with a thermostatic chamber, manufactured by A&D Company, Limited. at an extraction speed of 20 mm/min and 120° C., followed by secondary stretching at an extraction speed of 10 mm/min and 140° C., and thus a stretched thread was prepared.

Twenty stretched threads were bundled as pretreatment for observation of the cross-section of the thread, and two portions separated by approximately 5 mm in the bundle were bound, and the bundle was cut to produce a set of bundles of threads each with one bound portion remained. To a resin sheet for cutting (a peace in a width of 2 mm trimmed from the edge of a 1 cm×2 cm×0.5 cm sheet), double-sided adhesive tapes with a width of 1 mm were attached in parallel at intervals of 3 mm, and the bundle of threads was fixed on the double-sided adhesive tapes like a bridge. The bundle of threads with the sheet was subjected to plasma treatment (hydrophilizing apparatus, JEOL Ltd.) to hydrophilize the surface of the fiber, and the whole of the threads was embedded in a photocurable resin (LCR D-800 (TOAGOSEI CO., LTD.)), and then irradiated for photocuring with a halogen lamp of the visible-ray irradiator LUX SPOT II (visible ray irradiation) at the maximum irradiation level for 1 minute. After curing, the cross-section of the fiber was roughly cut with a glass knife in a microtome to expose a cut surface, which was cut out into serial sections each having a thickness of 70 to 90 nm with a diamond knife filled with water so as to allow the serial sections to float on the water surface, and thus intended cross-sections were obtained.

From the resulting sections each having an intended cross-section, 20 cross-sections of the stretched thread were selected, and observed with a Miniscope TM3030 manufactured by Hitachi High-Technologies Corporation in the normal mode at an accelerating voltage of 15 kV and a magnification rate of 1000×, and the images were saved. The cross-sectional images were subjected to image analysis with the image analysis software A-ZO KUN (manufactured by Asahi Kasei Engineering Corporation). First, a partial image region of a cross-section was extracted with the region size set at 50×50=2500 pixels. From the extracted image, a gray scale (256 steps) histogram was acquired by using a histogram acquisition program with multi-level image processing, and frequency distribution data were output from the histogram. The output gray scale frequency distribution data were opened in Excel manufactured by Microsoft Corporation, and the average value, variance, and standard deviation were calculated from the frequency distribution. From the standard deviation obtained, the carbon nanotube dispersibility was evaluated on the basis of the following criteria.

(Evaluation Criteria)

⊚: the standard deviation was less than 40 for all of the 20 cross-sections.

◯: the standard deviation was less than 70 for all of the 20 cross-sections.

x: a standard deviation of 70 or more was found for any of the 20 cross-sections.

(Evaluation 6) Moisture Releasability

In 50 g of a polyethylene powder, 150 mL of water at 80° C. was mixed, and the resultant was stirred for 30 minutes, and subjected to filtration with a Buchner funnel, and thereafter left to stand under blowing with nitrogen at 50° C. for 2 hours, and the weight, Wa, was measured. After being left to stand, the powder was placed in a 200 mL beaker, and vacuum-dried in the vacuum dryer AVO-250NS-D manufactured by AS ONE Corporation in an operation mode of timer operation and SV start operation at 50° C. for 30 minutes. The weight after drying, Wb, was measured, and the releasability for moisture was evaluated on the basis of Wb/Wa×100 as the reduction rate.

(Evaluation Criteria)

⊚: the reduction rate was 80% or more.

◯: the reduction rate was 60% or more and less than 80%.

x: the reduction rate was less than 60%.

[Preparation Example 1] Solid Catalyst Component [A-1]

Into an 8 L stainless steel autoclave the inside of which had been adequately purged with nitrogen, 1600 mL of hexane was added. While the content was stirred at 10° C. so that the Reynolds number of the fluid in the reactor was kept at $1.5 \times 10^6$, 800 mL of 1 mol/L hexane solution of titanium tetrachloride and 800 mL of 1 mol/L hexane solution of an organomagnesium compound represented by the composition formula $AlMg_5(C_4H_9)_{11}(OSiH)_2$ were added simultaneously over 4 hours in cycles of addition for 5 minutes and suspension for 5 minutes. After the addition, the temperature was gradually elevated, and the reaction was continued at 10° C. for 1 hour. After the completion of the reaction, 1600 mL of the supernatant was removed, and washing with 1600 mL of hexane was performed five times to prepare a solid catalyst component [A-1]. The quantity of titanium contained in 1 g of the solid catalyst component [A-1] was 3.05 mmol.

[Preparation Example 2] Solid Catalyst Component [A-2]

Into an 8 L stainless steel autoclave the inside of which had been adequately purged with nitrogen, 1600 mL of hexane was added. While the content was stirred at 10° C. so that the Reynolds number of the fluid in the reactor was kept at $1.48 \times 10^6$, 800 mL of 1 mol/L hexane solution of titanium tetrachloride and 800 mL of 1 mol/L hexane solution of an organomagnesium compound represented by the composition formula $AlMg_5(C_4H_9)_{11}(OSiH)_2$ were simultaneously added over 0.5 hours in a continuous manner. After the addition, the temperature was gradually elevated, and the reaction was continued at 10° C. for 1 hour. After the completion of the reaction, 1600 mL of the supernatant was removed, and washing with 1600 mL of hexane was performed five times to prepare a solid catalyst component [A-2]. The quantity of titanium contained in 1 g of the solid catalyst component [A-2] was 3.10 mmol.

[Preparation Example 3] Carrier (B-1)

Into an 8 L stainless steel autoclave the inside of which had been adequately purged with nitrogen, 1000 mL of 2 mol/L hexane solution of hydroxytrichlorosilane was charged, and 2550 mL of hexane solution of an organomagnesium compound represented by the composition formula $AlMg_5(C_4H_9)_{11}(OC_4H_9)_2$ (corresponding to 2.68 mol of magnesium) was added dropwise over 4 hours while the fluid in the reactor was stirred at 65° C. so that the Reynolds number of the fluid in the reactor was kept at $1.55 \times 10^6$, and further the reaction was allowed to continue with stirring at 65° C. for 1 hour. After the completion of the reaction, the supernatant was removed, and washing with 1800 mL of hexane was performed four times. This solid (carrier (B-1)) was subjected to pressure decomposition with a microwave digestion apparatus (model ETHOS TC, manufactured by Milestone General K.K.), and analyzed by using ICP-AES (inductively coupled plasm mass spectrometer, model X series X7, manufactured by Thermo Fisher Scientific Inc.) with an internal standard method, and it was found that the quantity of magnesium contained in 1 g of the solid was 8.31 mmol.

[Preparation Example 4] Solid Catalyst Component [B]

To 1970 mL of a hexane slurry containing 110 g of the carrier (B-1), 110 mL of 1 mol/L hexane solution of titanium tetrachloride and 110 mL of 1 mol/L hexane solution of an organomagnesium compound represented by the composition formula $AlMg_5(C_4H_9)_{11}(OSiH)_2$ were added simultaneously with stirring at 10° C. over 2 hours in cycles of addition for 5 minutes and suspension for 5 minutes. After the addition, the reaction was allowed to continue at 10° C. for 1 hour. After the completion of the reaction, 1100 mL of the supernatant was removed, and washing with 1100 mL of hexane was performed twice to prepare a solid catalyst component [B]. The quantity of titanium contained in 1 g of the solid catalyst component [B] was 0.75 mmol.

Example 1

Hexane, ethylene, and catalysts were continuously fed to a vessel-type 300 L polymerization reactor with a stirrer to obtain a polymer slurry, where the polymerization temperature was kept at 70° C. through cooling of the jacket; hexane was fed from the bottom of the polymerization reactor at 80 L/Hr; the catalysts used were the solid catalyst component [A-1] and triisobutylaluminum as a cocatalyst; the solid catalyst component [A-1] was added from an intermediate portion between the liquid surface and bottom of the polymerization reactor at a rate of 0.2 g/Hr; triisobutylaluminum was brought into contact with the solid catalyst component [A-1] at a rate of 10 mmol/Hr, and then added from the introducing line for the solid catalyst component [A-1]; the contact time of the solid catalyst component [A-1] and triisobutylaluminum was adjusted to 30 seconds; before introducing the solid catalyst component [A-1] and triisobutylaluminum, they had been stored in advance in a storage tank for introduction retained at 70° C., which was a temperature comparable to the reactor temperature; ethylene was fed from the bottom of the polymerization reactor and the polymerization pressure was kept at 0.2 MPa; and the production rate of polyethylene was 10 kg/Hr.

The polymer slurry obtained was continuously extracted to a flush drum with a pressure of 0.05 MPa so as to keep the liquid level in the polymerization reactor constant, and unreacted ethylene was separated away. The polymer slurry was continuously fed to a centrifuge so as to keep the liquid level in the flush drum constant, and the polymer was separated from the other solvent and so on, where the content of the solvent and so on based on the quantity of the polymer was 45% by mass, and continuous operation was stably achieved, without any lump of the polymer or clogging of a piping for slurry extraction.

The polymer separated was dried under blowing with nitrogen at 85° C. for 4 hours. During the drying, steam was sprayed on the polymer after polymerization to deactivate the catalyst and cocatalyst. The polymer after drying was passed through a sieve having a mesh size of 425 µm, and the residue remained on the sieve was removed, and thus a polyethylene powder PE1 was obtained.

For the polyethylene powder obtained in Example 1, (Physical property 1) Specific surface area, (Physical property 2) Pore volume, (Physical property 3) Full width at half maximum of melting endothermic peak, (Physical property 4) Viscosity-average molecular weight, (Physical property 5) Average particle size, (Physical property 6) Ratio of number of particular particles X and ratio of number of particular particles Y, and (Physical property 7) Angle of repose were determined in accordance with the above-described methods. The results are shown in Table 1. In addition, (Evaluation 1) Dissolution rate, (Evaluation 2) Undissolved matter, (Evaluation 3) Flowability, (Evaluation 4) Spinning stability, (Evaluation 5) Filler dispersibility, and (Evaluation 6) Moisture releasability were evaluated. The results are also shown in Table 1.

Example 2

A polyethylene powder PE2 was obtained by using the same operation as in Example 1 except that the solid catalyst component [B-1] was used as a catalyst in place of the solid catalyst component [A-1]. The physical properties and results of evaluation for the polyethylene powder PE2 are shown in Table 1.

Example 3

A polyethylene powder PE3 was obtained by using the same operation as in Example 1 except that the polymerization reaction was adjusted so that the content of the solvent and so on before drying the polymer changed from 45% by mass to 60% by mass. The physical properties and results of evaluation for the polyethylene powder PE3 are shown in Table 1.

Example 4

A solid catalyst component [A-3] was newly obtained by using the same operation as in Preparation Example 1 except that the Reynolds number was changed to $2.5 \times 10^4$. Thereafter, a polyethylene powder PE4 was obtained by using the same operation as in Example 1 except that the solid catalyst component [A-3] was used as a catalyst in place of the solid catalyst component [A-1]. The physical properties and results of evaluation for the polyethylene powder PE4 are shown in Table 1.

Example 5

A polyethylene powder PE5 was obtained by using the same operation as in Example 1 except that the polymerization temperature was changed from 70° C. to 85° C. The physical properties and results of evaluation for the polyethylene powder PE5 are shown in Table 1.

Example 6

A polyethylene powder PE6 was obtained by using the same operation as in Example 4 except that the polymerization temperature was changed from 70° C. to 85° C. The physical properties and results of evaluation for the polyethylene powder PE6 are shown in Table 1.

Example 7

A polyethylene powder PE7 was obtained by using the same operation as in Example 1 except that the polymerization temperature was changed from 70° C. to 85° C., and polymerization was performed with further addition of 1 mol % of hydrogen based on the total quantity of the substances present in the system in the polymerization reactor. The physical properties and results of evaluation for the polyethylene powder PE7 are shown in Table 1.

Comparative Example 1

A polyethylene powder PE8 of Comparative Example 1 was obtained by using the same operation as in Example 1 except that the drying temperature was changed from 85° C. to 160° C. The physical properties and results of evaluation for the polyethylene powder PE8 are shown in Table 2.

Comparative Example 2

A polyethylene powder PE9 of Comparative Example 2 was obtained by using the same operation as in Example 1 except that the drying temperature was changed from 85° C. to 55° C., and the drying time was changed from 4 hours to 12 hours. The physical properties and results of evaluation for the polyethylene powder PE9 are shown in Table 2.

Comparative Example 3

A polyethylene powder PE10 was obtained by using the same operation as in Example 1 except that the method of feeding ethylene and the solid catalyst component [A-1] was changed to a method of feeding them from inlets close to each other in the bottom of the polymerization reactor. The physical properties and results of evaluation for the polyethylene powder PE10 are shown in Table 2.

Comparative Example 4

A polyethylene powder PE11 was obtained by using the same operation as in Example 1 except that the solid catalyst component [A-2] was used as a catalyst in place of the solid catalyst component [A-1]. The physical properties and results of evaluation for the polyethylene powder PE11 are shown in Table 2.

Comparative Example 5

A polyethylene powder PE12 was obtained by using the same operation as in Example 1 except that the polymerization reaction was adjusted so that the content of the solvent and so on before drying the polymer changed from 45% by mass to 65% by mass. The physical properties and results of evaluation for the polyethylene powder PE12 are shown in Table 2.

Comparative Example 6

A polyethylene powder PE13 was obtained by using the same operation as in Example 1 except that the polymerization pressure was changed from 0.2 MPa to 0.05 MPa. The physical properties and results of evaluation for the polyethylene powder PE13 are shown in Table 2.

Comparative Example 7

A polyethylene powder PE14 was obtained by using the same operation as in Example 1 except that the solid catalyst component [A-2] was used as a catalyst in place of the solid catalyst component [A-1], and ethylene and the solid catalyst component [A-2] were fed from inlets close to each other in the bottom of the polymerization reactor. The physical properties and results of evaluation for the polyethylene powder PE14 are shown in Table 2.

Comparative Example 8

A polyethylene powder PE15 was obtained by using the same operation as in Example 1 except that the temperature adjustment for the storage tank for the solid catalyst component [A-1] and triethylaluminum was not performed (measured value: 30° C.). The physical properties and results of evaluation for the polyethylene powder PE15 are shown in Table 2.

TABLE 1

|  | Example 1 | Example 2 | Example 3 | Example 4 | Example 5 | Example 6 | Example 7 |
|---|---|---|---|---|---|---|---|
| Tyle of polyethylene powder | PE1 | PE2 | PE3 | PE4 | PE5 | PE6 | PE7 |
| (Physical property 1) Specific surface area [m$^2$/g] | 0.34 | 0.50 | 0.42 | 0.61 | 0.50 | 0.64 | 0.55 |
| (Physical property 2) Pore volume [mL/g] | 0.83 | 0.88 | 0.81 | 0.86 | 0.93 | 0.91 | 0.92 |
| (Physical property 3) Full width at half maximum of melting endothermic peak [° C.] | 5.07 | 5.17 | 5.70 | 5.20 | 5.30 | 5.11 | 5.63 |
| (Physical property 4) Viscosity-average molecular weight (Mv) [×100000] | 400 | 330 | 450 | 600 | 370 | 350 | 90 |
| (Physical property 5) Average partical size [μm] | 101 | 115 | 102 | 122 | 116 | 138 | 230 |
| (Physical property 6) Ratio of number of particular particles X [%] | 65 | 60 | 63 | 45 | 61 | 48 | 63 |
| (Physical property 6) Ratio of number of particular particles Y [%] | 33 | 31 | 30 | 29 | 20 | 22 | 26 |
| (Physical property 7) Angle of repose [°] | 40.8 | 38.2 | 34.6 | 42.5 | 43.2 | 43.9 | 37.7 |
| (Evalution 1) Dissolution rate | ⊚ | ⊚ | ○ | ○ | ⊚ | ○ | ○ |
| (Evalution 2) Undissolved matter | ⊚ | ○ | ○ | ○ | ○ | ○ | ○ |
| (Evalution 3) Flowability | ⊚ | ⊚ | ⊚ | ⊚ | ○ | ○ | ○ |
| (Evalution 4) Spinning stability | ⊚ | ⊚ | ⊚ | ⊚ | ⊚ | ⊚ | ⊚ |

TABLE 1-continued

|  | Example 1 | Example 2 | Example 3 | Example 4 | Example 5 | Example 6 | Example 7 |
|---|---|---|---|---|---|---|---|
| (Evalution 5) Filler dispersibility | ⊚ | ⊚ | O | ⊚ | O | ⊚ | O |
| (Evalution 6) Moisture releasability | ⊚ | ⊚ | O | ⊚ | O | O | O |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Type of polyethylene powder | PE8 | PE9 | PE10 | PE11 | PE12 | PE13 | PE14 | PE15 |
| (Physical property 1) Specific surface area [m²/g] | 0.18 | 1.02 | 0.56 | 1.07 | 0.62 | 0.45 | 0.90 | 0.26 |
| (Physical property 2) Pore volume [mL/g] | 0.78 | 0.84 | 1.10 | 0.97 | 0.87 | 0.84 | 0.99 | 1.04 |
| (Physical property 3) Full width at half maximum of melting endothermic peak [° C.] | 5.32 | 5.02 | 5.00 | 5.80 | 7.19 | 5.35 | 6.30 | 7.31 |
| (Physical property 4) Viscosity-average molecular weight (Mv) [×100000] | 500 | 550 | 410 | 300 | 660 | 510 | 340 | 380 |
| (Physical property 5) Average partical size [μm] | 170 | 150 | 130 | 120 | 210 | 50 | 180 | 110 |
| (Physical property 6) Ratio of number of particular particules X [%] | 62 | 60 | 64 | 64 | 62 | 67 | 37 | 58 |
| (Physical property 6) Ratio of number of particular particles Y [%] | 26 | 25 | 30 | 27 | 27 | 31 | 20 | 24 |
| (Physical property 7) Angle of repose [°] | 30.2 | 44.4 | 44 | 45 | 34.1 | 43.6 | 45.2 | 39.2 |
| (Evalution 1) Dissolution rate | O | O | O | X | X | O | X | X |
| (Evalution 2) Undissolved matter | X | X | X | X | O | O | X | X |
| (Evalution 3) Flowability | O | O | O | O | O | X | X | O |
| (Evalution 4) Spinning stability | O | O | O | X | X | O | X | X |
| (Evalution 5) Filler dispersibility | O | ⊚ | ⊚ | O | X | O | X | X |
| (Evalution 6) Moisture releasability | X | O | O | X | O | O | X | O |

From the above results, it can be appreciated that the polyethylene powder according to the present invention has a small surface area and small inner vacancies, and exhibits excellent solubility in an appropriate solvent, and thus an undissolved powder, which may cause defects in processing into a fiber, is generated in a smaller quantity. In addition, it can be appreciated that, by virtue of the small full width at half maximum of a melting endothermic peak, the powder evenly and homogeneously dissolves in a short period, and provides a carbon nanotube nanocomposite produced through stretching with satisfactory carbon nanotube dispersibility.

INDUSTRIAL APPLICABILITY

The polyethylene powder according to the present invention is capable of quickly dissolving in a solvent with less generation of undissolved matter, and is excellent in flowability and spinning stability, and provides a product after molding with excellent strength. Accordingly, the polyethylene powder according to the present invention is applicable to a wide variety of applications such as high-strength fibers for ropes, nets, bulletproof or protective clothes, protective gloves, fiber-reinforced concrete products, and helmets.

What is claimed is:
1. A polyethylene powder, wherein
the specific surface area of the polyethylene powder as determined by BET method is 0.20 m²/g or larger and 0.80 m²/g or smaller,
the pore volume of the polyethylene powder as determined by mercury penetration method is 0.95 mL/g or smaller,
the full width at half maximum of a melting endothermic peak of the polyethylene powder in differential scanning calorimetry is 6.00° C. or smaller,
the viscosity-average molecular weight of the polyethylene powder is 100000 or higher and 10000000 or lower, and the average particle size of the polyethylene powder is 100 μm or larger and 300 μm or smaller.

2. The polyethylene powder according to claim 1, wherein the viscosity-average molecular weight is 1000000 or higher and 9500000 or lower.

3. The polyethylene powder according to claim 1, wherein in the polyethylene powder, the ratio of the number of particles having an aspect ratio of 0.66 or larger and 0.84 or smaller to the total number of particles is 50% or higher.

4. The polyethylene powder according to claim 1, wherein in the polyethylene powder, the ratio of the number of particles having a degree of unevenness, as defined in the following formula (1), of 0.95 or higher to the total number of particles is 25% or higher:

$$UD = A/(A+B) \quad (1)$$

wherein UD represents degree of unevenness; A represents the projected area of a particle of interest; and (A+B) represents the projected area enclosed in an envelope connecting vertexes of the particle of interest.

5. The polyethylene powder according to claim 1, wherein the angle of repose in the polyethylene powder is 34° or larger and 45° or smaller.

6. The polyethylene powder according to claim 1, wherein the polyethylene powder is used for a fiber.

7. A fiber produced by using the polyethylene powder according to claim 6.

8. A molded article obtained through molding of the polyethylene powder according to claim 1.

* * * * *